US008844371B2

(12) United States Patent
Limacher et al.

(10) Patent No.: US 8,844,371 B2
(45) Date of Patent: *Sep. 30, 2014

(54) METHOD AND VORTEX FLOW MEASURING DEVICE FOR MONITORING AND/OR MEASURING WALL FLOW OF A MEDIUM OF TWO OR MORE PHASES FLOWING IN A PIPELINE

(75) Inventors: Peter Limacher, Aaran Rohr (CH); Dirk Sutterlin, Schopfheim (DE); Rainer Hocker, Waldshut (DE); Christoph Gossweiler, Winterthur (CH)

(73) Assignee: Endress + Hauser Flowtec AG, Reinach (CH)

( * ) Notice: Subject to any disclaimer, the term of this patent is extended or adjusted under 35 U.S.C. 154(b) by 439 days.

This patent is subject to a terminal disclaimer.

(21) Appl. No.: 13/255,437

(22) PCT Filed: Mar. 9, 2010

(86) PCT No.: PCT/EP2010/052981
§ 371 (c)(1),
(2), (4) Date: Sep. 8, 2011

(87) PCT Pub. No.: WO2010/103005
PCT Pub. Date: Sep. 16, 2010

(65) Prior Publication Data
US 2011/0314929 A1  Dec. 29, 2011

(30) Foreign Application Priority Data
Mar. 12, 2009  (DE) .................. 10 2009 001 525

(51) Int. Cl.
*G01F 1/32* (2006.01)
*G01F 1/74* (2006.01)
(52) U.S. Cl.
CPC ................ *G01F 1/74* (2013.01); *G01F 1/3209* (2013.01)
USPC .................................... 73/861.22; 73/861.04
(58) Field of Classification Search
None
See application file for complete search history.

(56) References Cited

U.S. PATENT DOCUMENTS

| 4,347,747 A | 9/1982 | Krishnaswamy |
| 4,876,897 A | 10/1989 | DeCarlo et al. |

(Continued)

FOREIGN PATENT DOCUMENTS

| DE | 102005003631 | 7/2006 |
| EP | 0 229 933 | 7/1987 |

(Continued)

OTHER PUBLICATIONS

English translation of International Preliminary Examination Report.

(Continued)

*Primary Examiner* — Harshad R Patel
(74) *Attorney, Agent, or Firm* — Bacon & Thomas, PLLC

(57) ABSTRACT

A method for monitoring and/or measuring an, at least at times, two-phase medium flowing in a pipeline, and having a first phase, especially a gaseous first phase, with a first density and a second phase, especially a liquid second phase, having a second density different from the first density. The method is performed with a vortex flow measuring device, which has at least one measuring tube inserted into the pipeline, a bluff body and a vortex sensor. In such case, the vortex sensor includes a sensitive section that responds to pressure fluctuations, and that is arranged at least partially adjoining the wall of the measuring tube. In the method, a wall flow of a second phase of a two or more phase medium is detected by the vortex flow measuring device, when a measurement signal which contains characteristic features for an interaction of a wall flow of the second phase of a flowing medium flowing along a wall of the measuring tube with the sensitive section of the first vortex sensor is registered by the vortex sensor.

9 Claims, 8 Drawing Sheets

(56) References Cited

U.S. PATENT DOCUMENTS

| | | | |
|---|---|---|---|
| 5,083,452 | A | 1/1992 | Hope |
| 5,121,658 | A | 6/1992 | Lew |
| 5,808,209 | A | 9/1998 | Zielinska et al. |
| 5,869,772 | A * | 2/1999 | Storer .................. 73/861.24 |
| 6,220,103 | B1 | 4/2001 | Miller et al. |
| 6,298,734 | B1 | 10/2001 | Storer et al. |
| 2006/0217899 | A1 | 9/2006 | Unsworth et al. |
| 2011/0314934 | A1 * | 12/2011 | Limacher et al. .......... 73/861.24 |

FOREIGN PATENT DOCUMENTS

| | | |
|---|---|---|
| EP | 0 666 468 | 8/1995 |
| WO | WO 03/102511 | 12/2003 |
| WO | WO 2009/003966 | 1/2009 |

OTHER PUBLICATIONS

Zhiqiang Sun et al., "On Measurement Property of Vortex Flowmeter in Bubbly Two-Phase Flows", Air Conference Proceedings AIP USA, No. 1, Jun. 2007, XP-002597581, pp. 246-250.

Hasna J. Khan et al., "Statistical Characterization of Air Water Bubbly Flow Using Differential Pressure Drop Measurements", ASME Fluids Engineering Division Meeting, vol. 165, Jun. 1993, pp. 137-144.

M. Pusayatonont et al., "Two-phase flow measurement based on the analysis of the sensor signal from a conventional vortex flowmeter", Proceedings of Flomeko. Imeko Conference on Flow Measurement, May 12, 2003, XP-002264396, pp. 1-8.

Andre J.M. Foussat et al., "Vertical Liquid-Liquid and Liquid-Gas Two-Phase Flow Measurements with a Vortex Flowmeter", Measuring Techniques in Gas-Liquid Two-Phase Flows Symposium, Jan. 1, 1984, XP-001156346, pp. 651-676.

Bernhard Menz, "Vortex flowmeter with enhanced accuracy and reliability by means of sensor fusion and self-validation", Measurement, Institute of Measurement and Control, vol. 22, Nos. 3-4, Nov. 12, 1997, XP-004123097, pp. 123-128.

J-P. Hulin et al., "Experimental Study of Vortex Emission Behind Bluff Obstacles in a Gas Liquid Vertical Two-Phase Flow", International Journal of Multiphase Flow, vol. 8, No. 5B, Oct. 1, 1982, XP-009022376, pp. 475-490.

C.W. Snoek, "A Selection of New Developments in Multiphase Flow Measurement Techniques", Experimental Thermal and Fluid Science, vol. 3, No. 1, Jan. 1990, XP-002597583, pp. 60-73.

J. E. Amadi-Echendu et al., "Analysis of signals from vortex flowmeters", Flow Measurement and Instrumentation, vol. 4, No. 4, Oct. 1993, XP-002597584, pp. 225-231.

Zhiqiang Sun, "Mass flow measurement of gas-liquid bubble flow with the combined use of a Venturi tube and a vortex flowmeter", Measurement Science & Technology, vol. 21, No. 5, May 2010, XP-002597585, pp. 1-7.

W. B. Collis et al., "Higher-Order Spectra: The Bispectrum and Trispectrum", Mechanical Systems and Signal Processing, vol. 12, No. 3, May 1998, XP-002597586; pp. 375-394.

German Search Report in corresponding German Application No. 10 2009 001 525.6.

International Search Report in corresponding International Application No. PCT/EP2010/052981.

* cited by examiner

METHOD AND VORTEX FLOW MEASURING DEVICE FOR MONITORING AND/OR MEASURING WALL FLOW OF A MEDIUM OF TWO OR MORE PHASES FLOWING IN A PIPELINE

TECHNICAL FIELD

The present invention relates to a method for monitoring and/or measuring a medium of, at least at times, two phases flowing in a pipeline, of which a first phase, especially a gaseous first phase, has a first density and a second phase, especially a liquid second phase, has a second density different from the first density. The method is performed by means of a bluff body protruding into the flowing medium and a vortex sensor, especially a vortex sensor placed downstream from or within the bluff body. The invention also relates to a correspondingly embodied vortex flow measuring device.

BACKGROUND DISCUSSION

Vortex flow measuring devices are frequently used for measuring flow of fluids in pipelines, especially of gas flows or vapor flows in a high temperature range. In such vortex flow measuring devices, a flow impediment is arranged in the flow path in such a manner that the fluid can flow past on both sides of the flow impediment. In such case, vortices are shed on both sides of the flow impediment. Across a broad Reynolds number range, the vortices are in such case shed alternately on both sides of the flow impediment, so that a staggered arrangement of vortices arises. This staggered arrangement of vortices is referred to as a Kármán vortex street. Utilized in such case in vortex flow measuring devices is the principle that frequency of vortex shedding—the so-called vortex frequency—with which these vortices are formed is proportional across a broad Reynolds number range to the flow velocity of the respective fluid. Accordingly, from the registered frequency of vortex shedding, which is referred to in the following as the vortex frequency, and from a calibration factor characteristic for the particular type of vortex flow measuring device, the flow velocity can be determined.

In such case, a vortex flow measuring device includes, as a rule, a measuring tube, in whose flow path a bluff body is arranged as a flow impediment. In such case, the bluff body usually extends in a diametral direction either completely across or over a considerable part of the inner cross section of the measuring tube in such a manner that the fluid can flow past on both sides of the bluff body. In such case, as a rule, at least two shedding edges which support a shedding of vortices are formed on the two sides of the bluff body. During use, the measuring tube is inserted into a pipeline whose fluid flow should be measured, so that the fluid flow flows through the measuring tube and at least partially against the bluff body.

Additionally, the vortex flow measuring device includes, as a rule, at least one vortex sensor, which responds to pressure fluctuations produced by vortices. This is arranged downstream from the two shedding edges. The vortex sensor can, in such case, be arranged within the bluff body, or downstream from the bluff body, especially as a separate component. The pressure fluctuations registered by the vortex sensor are converted into an electrical measurement signal, whose frequency is directly proportional to the flow velocity of the fluid. If the density of the fluid is additionally ascertained, or if such is known, the mass flow of the fluid can be calculated from the flow velocity and the density.

Vortex flow measuring devices of the type described above are used above all for measuring single phase media, especially fluids (liquids, gases). In special applications, it can, however, also occur that two or more materials, especially two or more fluids of different densities and compositions are present in the flow measurement. This can, in such case, involve the same material (e.g. water), which is simultaneously present in two phases or aggregate states. In the following, for purposes of simplification, the first phase and the second phase of a two or more phase medium flowing in the pipeline are discussed, wherein the first and second phases represent the two main phases with the largest mass flow fractions. Other phases can be contained in one or also in both phases, especially as solid particles. In such case, the first and second phases of the flowing two or more phase medium can be different aggregate states of the same material—as is, for example, the situation in the case of water condensate in steam—or they can also be two different materials, such as, for example, sand entrained in a liquid, etc. The first and second phases are especially each a fluid (liquid, gas). The wall flow can, in such case, also be in turn formed of more than just one medium, especially two different materials. Reference is also in each case made to this variant in the case of the further developments explained below, even when this is not explicitly noted (through the statement of "at least a second phase") each time. The invention is especially applicable in the case of such mixtures of two phases, in the case of which the two phases do not (or only slightly) mix and the density difference between the two phases is so high that, in the case of flow through a pipeline, the second phase at least partially flows as a wall flow, especially along a lower tube wall section in the case of pipeline extending in a horizontal or inclined manner. The invention especially relates to such combinations in the case of which the second phase is a liquid running on the bottom and the first phase is a gas.

It is known that, in vortex flow measuring devices, the occurrence of two or more media leads to measurement errors in the flow velocity ascertained from the vortex frequency.

An example of the occurrence of a medium with two different phases flowing in a pipeline is the formation of liquid rivulets in gas lines. In such case, a liquid which flows along a wall of the respective pipeline as a wall flow is referred to as liquid rivulet, or generally as a rivulet. This case is also especially relevant with regard to vapor lines (steam lines), in which a wall flow composed of water can form as a second phase. Besides liquid rivulets in gas lines, however, solid bodies capable of flowing in liquid flows—such as, for example, sand—can also be brought along, so that the sand flow (mixed with liquid) flows along a wall of the respective pipeline, similar to the case of the above mentioned liquid rivulets. If the pipeline flowed through is arranged horizontally or inclined (with respect to the direction of the force of gravity) and the wall flow (of the second phase) has a higher density than the first phase conveyed in the pipeline, the wall flow then flows as a rule along a lower section of the wall of the pipeline.

In such case, for many applications, it is desirable to detect, reliably and without considerably increased costs, the occurrence of a second phase in a flow of a first phase, and, in given cases, also to determine the proportion of the second phase, and especially its mass flow. This is especially the case in applications in which steam is transported over larger distances. The supplying of hot steam in pipelines is utilized in industrial plants especially for providing energy, wherein, for this purpose, a high steam quality, which corresponds to a low fraction of liquid water, is required. In such case, the requirement especially often exists that the steam quality lies above 95%. The steam quality is, in such case, given as the ratio of the mass flow of the steam fraction to the total mass flow composed of steam and condensed water. Hot steam conveyed in pipelines is also used in the field of oil transport.

There exist various fundamental ways by which the second phase of a flowable, two or more phase medium can be transported in a pipeline. As already explained, the second phase can flow as a wall flow—especially as a rivulet—along a wall of the relevant pipeline. Additionally, the second phase also can be carried in the flow distributed relatively uniformly in the first phase as droplets or particles. These two types of flow of the second phase can, depending on circumstance, also occur simultaneously, or each occur only individually. Besides these two states of flow, there are also other known states, such as, for example, slug or bubble flow.

As is subsequently explained in more detail, the present invention primarily concerns the problem of reliable and prompt detection of wall flow of a second, flowable phase that flows along a wall of a pipeline, especially detection of a rivulet.

In the publication US 2006/0217899 A1, a method is described for monitoring fluid flow in a pipeline by means of a flow measuring device arranged in the pipeline. In such case, signal properties—essentially the RMS value (Root-Mean-Square)—are analyzed across a broadband frequency range of the signal, in order generally to detect the occurrence of two-phase flow. In such case, the different types of flow, especially the two types of flow explained above, are not distinguished between. In the publication US 2006/0217899 A1, it is especially noted that, for determining the second phase, explicitly those fluctuations are taken into consideration which do not lie in the wanted signal frequency range, and conventionally are suppressed for a better registering of the wanted signal. In particular, in the publication US 2006/0217899 A1, it is determined that the signal amplitude, calculated as an RMS value of the signal spectrum across a broadband region with high-frequency signal fractions of the vortex flow measuring device decreases with an increasing flow of the second phase. Accordingly, in the context of calibration, it is proposed to correlate the broadband RMS-values ascertained from the spectrum, the registered vortex frequency and the flow rate of the second phase, in order to then be able during use to ascertain the flow rate of the second phase from the measured signal amplitude and the registered vortex frequency. A disadvantage of the method described in the publication US 2006/0217899 A1 lies in the fact that, in given cases, disturbances, as can typically occur in the form of vibrations, can strongly corrupt the broadband RMS-value, and the certain detection of a second phase is therewith not assured.

SUMMARY OF THE INVENTION

An object the present invention is to provide a method, as well as to provide a vortex flow measuring device, via which an, at least at times, two-phase medium, which flows in a pipeline, and which has a first phase, especially a gaseous first phase, with a first density, and a second phase, especially a liquid phase, with a second density different from the first density, can be monitored reliably, promptly and without considerable costs, wherein the second phase flows along the wall of the pipeline mainly in the form of a wall flow, especially in the form of a rivulet.

In the present invention, a method is provided for monitoring and/or measuring an, at least at times, two-phase medium, which flows in a pipeline, and which has a first phase, especially a gaseous first phase, with a first density and a second phase, especially a liquid second phase, with a second density different from the first density. The method is performed by means of a bluff body protruding into the flowing medium and by means of a vortex sensor, especially a vortex sensor placed downstream from or within the bluff body. The invention further includes a vortex flow measuring device matched to the vortex sensor. The method moreover includes steps as follows:

a) Producing Kármán vortices in the flowing medium by means of the bluff body at least near the vortex sensor, wherein the vortices are shed by the bluff body with a vortex shedding frequency (vortex frequency) dependent on an instantaneous flow velocity of the flowing medium;

b) permitting at least a portion of the second phase of the flowing medium to flow along a wall near the vortex sensor;

c) registering periodic pressure fluctuations caused by the Kármán vortices in the flowing medium by means of the vortex sensor for producing a sensor signal hereinafter also called measurement signal corresponding to the pressure fluctuations;

d) selecting from the sensor signal a wanted signal component, which has a frequency band, especially a narrow frequency band, containing the vortex shedding frequency, especially a frequency band with a relative bandwidth smaller than 50% of the instantaneous vortex shedding frequency, wherein the instantaneous vortex shedding frequency corresponds to the center frequency of the frequency band, and e) detecting presence of the second phase of the flowing medium making use of the wanted signal component selected from the sensor signal, especially based on a standard deviation of an amplitude curve of the wanted signal component and/or based on a kurtosis of the wanted signal component.

According to this, the present invention makes it possible, using a vortex flow measuring device, via which, during use, the flow velocity of the first phase of a flowable, two or more phase medium, especially a gas, can be determined from the registered vortex frequency of the vortices, also simultaneously to detect promptly (i.e. online) the occurrence of a wall flow of the second phase—especially of a rivulet—along the wall of the measuring tube of the flowing two phase medium. For detection of a wall flow of the second phase, no additional device is in such case required. Accordingly, the number of components, and therewith the costs, can be kept small. The detection of a rivulet is especially achieved in that the sensitive section is arranged at least partially adjoining the wall of the measuring tube, so that, in the case of a wall flow of the second medium flowing past, the second medium can interact with the sensitive section. Via the sensitive section, in addition to the characteristic measured variable (vortex frequency) of the vortices of the first phase of the flowing medium, the characteristic features of the second phase caused by the interaction with the wall flow can accordingly also be registered. This leads to a measurement signal, which contains both the measured variable of the first phase, as well as also the measured variable of the second phase. On the basis of this measurement signal, it can then easily be detected whether a wall flow of the second phase is present. This can, for example, also occur automatedly via the vortex flow measuring device, and be displayed for a user on-site, or be signaled in another manner, for instance, in a control room remote from the measuring device.

The vortex flow measuring device can, apart from the special features explicitly mentioned herein, basically be constructed in various ways, especially such ways as are known from the state of the art. The basic construction can especially correspond to a vortex flow measuring device as such was explained in the introductory section. As is explained above, the sensitive section of the first vortex sensor is in such case arranged at least partially adjoining on the wall of the measuring tube. The term "adjoining arrangement" includes, in such case, arrangements, in the case of which the sensitive section begins directly at the wall of the measuring tube, as well as arrangements, in the case of which the sensitive section is located at such a small distance from the wall of the measuring tube, that, in the case of typical occurring wall flows, the thickness of the wall flow is greater than the distance of the sensitive section from the wall, and an interaction of the wall flow with the sensitive section can therewith occur. Additionally, the sensitive section extends in the direction of the inner space of the measuring tube, so that an interaction with the flow of the first phase of the flowing, two or more phase medium also occurs. In such case, it is especially provided that the sensitive section extends parallel to the bluff body and, relative to the flow direction, is arranged aligned to the bluff body.

As a measurement signal, which contains characteristic features for an interaction of a wall flow of the second phase of a two or more phase medium flowing along a wall of the measuring tube with the sensitive section of the first vortex sensor, especially, a measurement signal is meant, which has characteristic deviations compared to a measurement signal in the case of a pure flow of the first phase of a flowing two or more phase medium, wherein these characteristic deviations are brought about by interaction of the wall flow of the second phase of the flowing two or more phase medium with the sensitive section of the first vortex sensor. Due to the arrangement of the sensitive section, the interaction is, in such case, direct, which means that the wall flow flows directly past the sensitive section (in given cases, contacting the latter), and therewith triggers pressure fluctuations, which are registered via the sensitive section.

In an advantageous further development, the measuring tube is arranged at an angle to a vertical direction, especially arranged horizontally, and the sensitive section of the first vortex sensor is arranged in a lower half of the measuring tube, especially at the lowest surface element of the measuring tube located furthest down. Via such a horizontal or inclined attitude of the measuring tube, due to the force of gravity, the wall flow of the second phase collects primarily in a lower half of the measuring tube. Accordingly, via the targeted arrangement of the sensitive section in a lower half of the measuring tube, especially at the lowest surface element of the measuring tube, it can be assured that the wall flow of the second phase can be detected by the vortex flow measuring device. The measuring tube can, in such case, be arranged horizontally, that is perpendicular to the direction of the force of gravity, or essentially perpendicular, so that the force of gravity does not or does not noticeably affect the flow velocity of the second phase.

In an advantageous further development, the sensitive section of the first vortex sensor is formed by a swinging section, which, via occurring pressure fluctuations brought about by the vortices shed at the bluff body, is displaceable with a swinging movement. In such case, in the step of registering, swinging movements of the pivotable section are converted into the electrical measurement signal. The conversion occurs, in such case, in such a manner that the amplitude of the electrical measurement signal as a function of time corresponds to the swinging movements. The conversion of the swinging movements into an electrical measurement signal can, in such case, occur in various ways, especially via a capacitive, a piezoresistive, an optical, an ultrasound, a thermistor, or a mechanical registering of the particular position of the swinging section, as well as via a registering of the particular position of the swinging section via pressure, or strain, gage.

The registering of the particular (time-dependent) position of the swinging section can especially occur via a DSC (Digital Switched Capacitor) sensor. In the case of this sensor type, the swinging movements of the swinging section are converted by means of two electrically connected capacitances into differential electrical charge changes, and are evaluated by a suitable measuring electronics. Such DSC sensors are described in EP 0 229 933 A1.

As is explained above, the swingable section of the vortex sensor, which can especially be embodied as a swingable shell, can be integrated into the bluff body. It can especially be accommodated in a blind bore of the bluff body. The blind bore is, in such case, in communication with the flow within the measuring tube via one or more passageways, so that the swingable section can record pressure fluctuations via these passageways. Additionally, the vortex sensor includes, as a rule, a section decoupled from the pressure fluctuations. This section is arranged, for example, within the swinging section, especially within the swinging shell. The section decoupled from the pressure fluctuations is, in such case, arranged, as a rule, in a locationally fixed manner, apart from movements due to external disturbing influences. In this way, in one of the ways explained above, the distance changes between the swinging and the decoupled section can be registered, and be converted into an electrical measurement signal. In the present invention, the passageways are in such case arranged at least partially adjoining the wall of the measuring tube, so that an interaction of a wall flow of the second medium flowing along the wall of the measuring tube with the swinging section of the vortex sensor is enabled. If the measuring tube is arranged horizontally or inclined, the passageways are then arranged at least partially in a lower half of the measuring tube.

Additionally, the swinging section of the vortex sensor can be formed by a separately formed swinging paddle arranged downstream from the bluff body, or also one partially or completely arranged in the bluff body and introduced through a cavity, this paddle extending from a wall of the measuring tube into the flow path. The paddle can, in such case, essentially extend radially (to the measuring tube) and parallel to the bluff body, and be arranged aligned to the bluff body relative to the direction of extension of the measuring tube. Again, also in the case of this embodiment, the vortex sensor as a rule includes a section decoupled from the pressure fluctuations. The section decoupled from the pressure fluctuations is, in such case, arranged as a rule in a locationally fixed manner, apart from movements due to external disturbing influences. Accordingly, the distance changes between the swinging and the decoupled section can be registered in one of the ways explained above, and can be converted into an electrical measurement signal.

The time-dependent (electrical) measurement signal y(t) can be described approximately with a frequency/amplitude modulation signal having a superimposed noise fraction. It is composed of the actual vortex signal, which can be described by a sinusoidal oscillation having a time-dependent amplitude A(t), and a likewise time-dependent phase Θ(t), plus additive noise fractions R(t) of different origins and with different characteristics. Thus, the noise is caused by differential pressure fluctuations in the flow due to flow noise. The noise fractions can also occur due to superimposed oscillations due to vibrations or also due to resonance signals defined by the sensor or construction of the measuring device, which are mechanically coupled into the sensor. The vortex signal can, consequently, approximately be described by the following formulas (1):

$$y(t) = A(t) \cdot \sin(\Theta(t)) + R(t) \quad (1)$$

$$A(t) = A_0 + \Delta a$$

$$\Theta(t) = \omega_{mv}(t) \cdot t + \int_0^t m(t)dt$$

$$2 \cdot \pi \cdot f_{mv}(t) = \omega_{mv}(t) = \dot{\Theta}(t)$$

The time-dependent amplitude A(t) is composed of an average amplitude $A_0$ and an additive amplitude variation $\Delta a$, which possesses an assumed Gaussian distribution with average value of 0 and variance $\sigma_A^2$.

The relationship of the variable phase $\Theta(t)$ and the instantaneous vortex frequency $f_{mv}(t)$ is given by the first derivative of the variable phase $\Theta(t)$ composed of the instantaneous vortex angular frequency $\omega_{mv}(t)$ and the additive phase noise, which is defined by the integral of a frequency modulation m(t) over time. The frequency modulation is assumed as Gaussian noise with an average value of 0 and variance $\sigma_R^2$.

A typical measurement signal and its spectrum are shown in FIG. 3.

In order to monitor the flowing medium for a second phase in the form of a rivulet or wall flow, and also to estimate the volume or mass fraction of this second phase, the measurement signal y(t), as is explained below with reference to a further development, can first be filtered with a small relative bandwidth with the vortex frequency as the center frequency The filtered real signal s(t)—or also in particular the amplitude $A_s(t)$ of the filtered real signal s(t)—then contains the necessary information which permits a statement concerning the presence of a second phase and its mass fraction. The fluctuations of the amplitude of the narrow band filtered signal can now be registered and expressed statistically—for example, via the standard deviation of the amplitude $A_s(t)$—or also via the kurtosis of the narrow band filtered signal s(t), and represent a direct measure, which can be taken into consideration for detection of a presence of and/or for the measuring of the mass fraction or volume fraction of a second phase.

A possible embodied variant of the above described selective filtering and signal processing is described here. The amplitude $A_s(t)$ can especially be gained via the analytical signal of the filtered measurement signal s(t). For this, the filtered measurement signal is converted by means of a Hilbert transformation into a filtered analytical signal $s_a(t)$:

$$s_a(t) = I(t) + j \cdot Q(t) = |A_s(t)| \cdot e^{j\Phi(t)} \quad (2)$$

The filtered analytical signal $s_a(t)$ is composed of the real part I(t) (in-phase signal), which corresponds to the filtered real signal s(t), and the complex part Q(t) (quadrature signal); j is the complex operator $\sqrt{(-1)}$ (square root).

An instantaneous magnitude amplitude $|A_s(t)|$ for the point in time $t=t_i$ can then be calculated as in (3):

$$|A_s(t)| = \sqrt{I(t)^2 + Q(t)^2} \quad (3)$$

Furthermore, the instantaneous vortex frequency can be calculated from the analytical signal by differentiating the phase $\Phi(t)$ with respect to time:

$$\Phi(t) = \arctan\left(\frac{Q(t)}{I(t)}\right) \quad (4)$$

-continued $$f_v = \frac{1}{2\pi} \cdot \frac{d\Phi(t)}{dt}$$

Due to the interaction of a wall flow of the second phase flowing along a wall of the measuring tube with the sensitive section of the first vortex sensor, an increased fluctuation of the amplitude of the narrow band filtered analytical signal $s_a(t)$ is measurable over time. The interaction thus leads to an increased amplitude modulation of the registered narrow band filtered measurement signal. These fluctuations are, according to a number of further developments of the invention, statistically evaluated, and are taken into consideration as a measure of whether a—and, in given cases, how much—mass/volume flow of a wall flow is occurring in the form of the second phase. Accordingly, by determining the fluctuations of the magnitude of the amplitude, $|A_s(t)|$, of the narrow band filtered analytical signal $s_a(t)$ over time, a wall flow of the second phase can be easily detected and measured. The fluctuations of the magnitude of the amplitude, $|A_s(t)|$, can, for example, be evaluated and monitored automatically within the vortex flow measuring device, especially via a correspondingly embodied electronics. With "electronics", reference is made in the present application both to an electronic circuit, through which signals, especially electrical signals, are processed in an analog manner, as well as also to a circuit or a processor working in a digital manner, through which electrical signals are digitally processed. These two forms can especially also occur in combination.

It is known that other developments can be taken into consideration for amplitude measurement and for statistical evaluation of the fluctuations. Thus, for example, a rectifier and a low-pass filter connected thereafter can also detect an average amplitude and its fluctuation. It is also known that the evaluation of the amplitude fluctuations can occur in other ways.

As already mentioned in one of the previous sections, in addition to other statistical evaluation options, the standard deviation of the magnitude of the amplitude, $|A_s(t)|$, can especially be taken into consideration. It has been found that the higher the estimated standard deviation of the magnitude of the amplitude is, the higher is the fraction of the second phase occurring in the form of a wall flow. Additionally, the kurtosis of the filtered real part of the analytical signal $s_a(t)$, $re\{s_a(t)\}$ for short, which corresponds to s(t), can also be taken into consideration as a measure for the mass/volume fraction of the second phase. This is because the higher the kurtosis of $re\{s_a(t)\}$ is, the greater are the deviations from a pure sinusoidal oscillation, which has a value for the kurtosis of 1.5.

Both in the case of determining the standard deviation of the magnitude of the amplitude of the analytical signal as well as also in the case of determining the kurtosis of the narrow band filtered measurement signal s(t), it is made possible that, beforehand (for a particular combination of a first and a second phase of a two or more phase flowing medium), limit values for the standard deviation or for the kurtosis can be defined, in the case of whose exceeding a second phase is present, and can accordingly be detected. Additionally, a further limit value can additionally or alternatively be defined, in the case of whose exceeding a particular mass flow of the second phase is exceeded, and a warning report is accordingly output.

The standard deviation $\sigma_A$ of the magnitude of the amplitude $A_s(t)$ can be calculated on the basis of the following equation:

$$\sigma_A = \sqrt{\frac{1}{N} \sum_{t_i=t_1}^{t_i=t_N} (|A_s(t_i)| - \overline{A}_s)^2} \quad (5)$$

In total, N values are taken into consideration in the calculating. $\overline{A}_s$ is the arithmetic average of the magnitude of the amplitude measured over N values.

The kurtosis $\beta$ (or the normalized fourth moment) of the narrow band filtered measurement signal s(t) can be calculated from the fourth moment $\mu_4$ and the standard deviation $\sigma_s$ via the Equation (6), set forth below. The standard deviation $\sigma_s$ can, in such case, be obtained per Equation (7), and the fourth central moment $\mu_4$ can be obtained from Equation (8).

$$\beta = \frac{\mu_4}{\sigma_s^4} \quad (6)$$

$$\sigma_s = \sqrt{\frac{1}{N} \sum_{t_i=t_1}^{t_i=t_N} (s(t_i) - \bar{s})^2} \quad (7)$$

$$\mu_4 = \frac{1}{N} \sum_{t_i=t_1}^{t_i=t_N} (s(t_i) - \bar{s})^4 \quad (8)$$

$t_i$ stands for a discrete point in time of the measuring.

In total, N values are taken into consideration in the calculation, wherein $s(t_i)$ is the value of the narrow band filtered measurement signal at point in time of measurement $t_i$ and $\bar{s}$ is the arithmetic average of the N values of the narrow band filtered measurement signal.

The kurtosis $\beta$, or the fourth moment, is, in such case, a measure for the peakedness of a statistical distribution (around its average value). Besides the fourth moment, there is also, as is known, the first moment, which corresponds to the expected value of a random variable, that is to the average value; the second moment, which corresponds to the variance; and the third moment, which, after normalization, is also referred to as the skewness. Skewness and peakedness are often used as measures for deviation from the normal distribution.

While the Equations (5), (7) and (8), in each case hold for N discrete values, a corresponding representation in the form of an integral is also possible for a continuously registered progression of the respective signals. The determining of the standard deviation and/or the kurtosis by a correspondingly embodied electronics within the vortex flow measuring device can, in such case, occur in such a manner that the respectively ascertained magnitude of the amplitudes, $|A_s(t)|$, or the measured values $s(t)$ at the discrete points in time $t=t_i$, with i as a consecutive whole number, are stored in a buffer or ring memory. The storing can, in such case, occur in such a manner that a predetermined number of values are storable in the buffer memory, and that, in the case of adding a new value $|A_s(t_i)|$ or $s(t_i)$, the oldest value is deleted from the buffer memory, so that the individual values are "pushed" through the different positions of the buffer memory. The N values which are taken into consideration for calculating the standard deviation or the kurtosis can, in such case, be selected via a corresponding selection window of N values, such as, for example, 100 values. The calculation of the standard deviation or the kurtosis can, for example, occur each time within predetermined time intervals when, within the selection window, a value (or also a number of values) is added (and a corresponding number of old values have left), or also only when all values within the selection window have been replaced by new values.

In the advantageous further development already described in one of the above sections, for evaluating whether the measurement signal contains characteristic features for an interaction of a second phase in the form of a wall flow along a wall of the measuring tube with the sensitive section of the first vortex sensor, the measurement signal is selectively narrow band filtered with a small relative bandwidth, with the vortex frequency as the average frequency. Via such a selective filtering, only the frequency ranges in the region around the vortex frequency are taken into consideration, and disturbance fractions with frequencies which differ from the vortex frequency are filtered out. This frequency range especially has a width of less than 50% of the vortex frequency, with the vortex frequency as the average frequency.

In an advantageous further development, referencing a correlation which was created earlier in the context of a calibration for the particular first and second phases of a medium, a mass flow of the predetermined second phase is determined from a vortex frequency determined by the vortex flow measuring device from the measurement signal, and from a standard deviation or kurtosis determined by the vortex flow measuring device from the measurement signal. In such case, during the creation of the correlation, in each case, 1) known mass flows of a wall flow of a predetermined second phase, 2) vortex frequencies, which were determined from the measurement signal by the vortex flow measuring device for different flow velocities of the first phase, as well as, in each case, 3) the associated standard deviations or kurtosis determined from the measurement signal by the vortex flow measuring device, are (beforehand) placed in relationship to one another in the context of a calibration. This means that in the context of the calibration, both the various (known) mass flows of the second phase and different flow velocities of the first phase are set, and the associated vortex frequency and standard deviation or kurtosis for these different values is in each case determined by the vortex flow measuring device. On the basis of the correlation, during use of the vortex flow measuring device, based on the standard deviation or kurtosis determined from the measurement signal as well as the vortex frequency, and referencing the correlation, the mass flow of the wall flow of the second phase can then be quantitatively determined in a simple manner. Such a quantitative determining of the mass flow of the wall flow of the second phase is especially advantageous in the case of a horizontally arranged—or, if a horizontal arrangement is not possible, slightly inclined—measuring tube. In an advantageous further development, the correlation is especially stored in the vortex flow measuring device in the form of a fitted function.

In an advantageous further development, the determined mass/volume flow of the second medium is taken into consideration for the correction of a flow velocity or correction of a volume flow of the first phase, as determined from a vortex frequency determined from the measurement signal by the vortex flow measuring device. Due to the fact that the wall flow of the second phase within the measuring tube likewise occupies a volume, the actual flow velocity and/or the actual volume flow of the first phase deviates as a rule from the flow velocity or volume flow determined from the vortex frequency. On the basis of the determined mass flow of the wall flow of the second phase, especially the latter's volume can be estimated and, for example, the volume flow of the first phase accordingly corrected.

In addition to many others, one possible implementation for registering vortex frequency is, according to an advantageous further development, that the registered broadband measurement signal is filtered by two parallel filters to a narrow band frequency range around the vortex frequency, and is simultaneously converted into an analytical signal composed of a real part I(t)—and imaginary part Q(t). The two filters have, in such case, the exact same frequency response; however, they possess a phase difference of 90°. The phase difference of Q(t) relative to I(t), of 90° results solely from the coefficients of the quadrature filter which filters the real broadband measurement signal in Q(t). At the same time, the in-phase filter filters the real broadband measurement signal in I(t) without the phase shift.

Via such a filter arrangement, a filtering in a desired frequency range can be performed in an advantageous manner, and the real part (filtered by the filter, which is in phase) as well as also the complex part (filtered by the quadrature filter) of the analytical signal of the registered measurement signal can be obtained. If, for example, the measurement signal which forms the real part I(t) of the analytical signal is described as $S(t)*\sin(\omega_v t)$, wherein $\omega_v$ is the vortex frequency, the signal which is delivered in phase by the filter is then $I(t)=S(t)*\sin(\omega_v t)$, while the signal which is delivered by the quadrature-filter is $Q(t)=S(t)*\cos(\omega_v t)$.

Additionally, the two filters can be embodied in such a manner that they have the same group travel time. In this way, it can be assured that the real part I(t) as well as the associated complex part Q(t) are output at the same time by the two filters, with a 90° phase difference.

Additionally, in an implementation of the signal processing, it can be provided that the instantaneous magnitude of the amplitude $A_s(t)$ is formed from the real part I(t) and the complex part Q(t) by means of a CORDIC algorithm (COordinate Rotation Digital Computer). Via the CORDIC algorithm, the instantaneous phase $\Phi(t)$ of the analytical signal, which corresponds to the arctan(Q(t)/I(t)), can also simultaneously be obtained. By differentiating the phase $\Phi(t)$ with respect to time, the vortex frequency can additionally be obtained.

The preferred implementation can be put into practice in purely analog circuitry or purely digital circuitry, or in part in analog form and in part digital form, in order to obtain instantaneous phase and instantaneous amplitude information, which are taken into consideration for a statistical evaluation according to Equation (5) or/and (6), in order to obtain information concerning the presence of, and/or the mass flow fraction/volume flow fraction of, the second phase of a medium flowing in a pipeline.

In an advantageous further development, a second vortex sensor is provided, which is arranged downstream from the shedding edges of the bluff body, and which has a sensitive section responding to occurring pressure fluctuations, and which is arranged in an upper half of the horizontally arranged or inclined measuring tube. Via this second vortex sensor, pressure fluctuations are registered, which are produced by vortices mainly of the first phase, wherein the pressure fluctuations registered via the sensitive section of the second vortex sensor are converted into an electrical measurement signal, which is used as a reference signal for a pure flow of the first phase. This further development is especially advantageous when the sensitive section of the first vortex sensor is arranged in a lower half of the measuring tube, especially at the lowest surface element of the measuring tube. Through the provision of such a reference signal, the electrical measurement signal of the first vortex sensor (or also variables derived therefrom, such as, for example, a standard deviation or a kurtosis) can be compared in simple manner with the reference signal (or, in given cases, variables derived therefrom, such as, for example, a standard deviation or a kurtosis). In the case of this further development, on the basis of the comparison, a wall flow of a second phase, which (due to the force of gravity) flows in the lower half of the measuring tube and interacts with the sensitive section of the first vortex sensor, can be detected even without a previously performed calibration. In given cases, a warning can then be output via the vortex flow measuring device.

In the case of the second vortex sensor, apart from the special features of the arrangement, essentially the same further developments and variants are possible as were explained with regard to the first vortex sensor.

In an advantageous further development, the first vortex sensor includes a swinging paddle, which extends into the flow path through an opening which is formed downstream from the bluff body in a lower section of the measuring tube, especially at the lowest surface element of the measuring tube. Accordingly, the vortex sensor includes a sensitive section, which is arranged adjoining the wall and (at least partially) in the lower tube half. The use of a paddle as the sensitive section is advantageous since, in the case of an occurrence of a wall flow of a second phase, waves of the second phase as a rule strike against the paddle, and bring about therewith an increased fluctuation of the instantaneous magnitude of the amplitude of a narrow band filtered analytical signal of the registered measurement signal as a function of time.

In an additional embodiment of the invention, formed around the paddle is a recess for accommodating a portion of the second phase, which flows past as a wall flow. Via the recess and the collection of the second phase caused thereby in the case that it is flowing past as a wall flow in the region of the paddle, interaction between the second phase and the paddle is increased. The recess can, in such case, be embodied in such a manner, that, when the wall flow is interrupted, the second phase (especially the rivulet) remaining in the recess is taken along (or purged) by the first phase flowing past, and the recess is therewith emptied again. In this way, it is assured that at times when no wall flow is present, the measurement signal is not corrupted by a portion of the second phase remaining in the recess.

As in is explained in the introductory section, in addition to a wall flow of the second phase, a particle and/or droplet flow of the at least one, second phase (i.e. the same phase as in the case of the wall flow) or also of at least a third phase (i.e. of another medium than in the case of the wall flow) in the pipeline and therewith in the measuring tube can also additionally or alternatively occur. In such case, it is desirable that such a particle and/or droplet flow of the second or third phase can also be detected by the vortex flow measuring device and, in given cases, quantitatively determined. Accordingly, in an advantageous further development, it is provided that the method for detection of a distributed particle and/or droplet flow of the at least a second or at least a third phase has the following steps:

a) registering acoustic signals, which are produced by impingement of particles and/or droplets of the second or third phase on a component of the vortex flow measuring device protruding into a flow path within the measuring tube, especially by impingement on the bluff body, this registering occurring via an acoustic transducer, which is integrally formed into the component or is acoustically coupled with the component; and b) transducing the acoustic signals registered by the acoustic transducer, by the acoustic transducer, into electrical signals.

Via this further development, it is enabled that also the occurrence of a distributed particle and/or droplet flow of at least a second or third phase can simultaneously be detected promptly (i.e. online) with the vortex flow measuring device. No additional device is required for this, so the number of components and therewith the costs can be kept small. The detection of a distributed particle and/or droplet flow is in such case achieved by utilizing a (present) component of the vortex flow measuring device, which protrudes into a flow path within the measuring tube, simultaneously as an impingement area for a part of the particle and/or droplet flow within the first phase. The acoustic signals produced in such case by the impingement of particles and/or droplets of the second or third phase on the component are then transducible by the acoustic transducer into electrical signals, so that these signals are electrically processable or evaluable by the vortex flow measuring device (especially via a correspondingly embodied electronics of the vortex flow measuring device). Additionally, it can be provided that, in the case of a detection of a particle and/or droplet flow and/or an increased particle and/or droplet flow of the second or third phase, a warning report is output by the vortex flow measuring device.

The particle and/or droplet flow can, in such case, also be formed by more than just one medium, especially by particles of at least two different materials. Reference is also in each case made to this variant in the case of the further developments explained below, even when this is not each time explicitly noted (through the statement of "at least a second or third medium"). With the term "distributed particle and/or droplet flow", reference is, in such case, generally made to a flow, in the case of which the particles and/or droplets are (at least partially) distributed in the first phase as at least a second or third phase, and are carried by this first phase.

The term "acoustic transducer" refers to a transducer or sensor which registers incoming acoustic signals and transduces them into electrical signals, which correspond to the respective acoustic signals. As a variant, the acoustic transducer can, for example, be formed integrally in the component directly on the site or the area of the component on which the particles and/or droplets of the second phase impinge, and can directly register the produced acoustic signals. Alternatively, it can also be arranged at a distance from this site or the area of the component, for example, integrally in the component, or also separate from the component, and can be acoustically coupled to the component in such a manner that the respective acoustic signals (sound waves) can propagate from the site or the area of the component to the acoustic transducer. The acoustic transducer can especially also be arranged outside of the measuring tube.

In an advantageous further development, the component is formed by the bluff body of the vortex flow measuring device, and the bluff body has an impingement area directed essentially perpendicularly to the flow direction and facing the flow. In this way, the impingement area is directly impinged upon by the particle and/or droplet flow, and the ratio of the size of the impingement area to the total area of the inner cross section of the measuring tube can easily be determined. Additionally, the particles and/or droplets impinge upon the impingement area essentially at a uniform angle. A further advantage in the application of the bluff body is that, due to the alternating side, vortex shedding at the bluff body, the arriving flow is already influenced in the region before the bluff body. This leads to the impingement area of the bluff body being flowed on not exactly perpendicularly, but instead in a slightly inclined manner on alternating sides (corresponding to the frequency of the vortex shedding). In this way, it is effectively prevented that particles and/or droplets collect on the impingement area of the bluff body.

Fundamentally, the transducing of the acoustic signals into electrical signals can be done by the acoustic transducer in various ways. In an advantageous further development, the acoustic transducer is formed by a piezoelectric transducer or by a capacitive transducer. In an additional advantageous further development, the acoustic transducer is arranged outside of the measuring tube, and is acoustically coupled with the component of the vortex flow measuring device, especially the bluff body. In this way, the acoustic transducer is largely decoupled from the process temperature and process pressure.

In an advantageous further development, an electronics of the vortex flow measuring device is embodied in such a manner that the electrical signals provided by the acoustic transducer are evaluated by the electronics according to predetermined criteria. This electronics can, in such case, be integrated into an (already present) electronics of the vortex flow measuring device, by which a measurement signal of the first vortex sensor is evaluated. Additionally, corresponding reports (such as, for example, warning reports, quantitative specifications of the particle and/or droplet flow, etc.) can be output by the vortex flow measuring device, and especially can be presented on a display.

In an advantageous further development, an electronics of the vortex flow measuring device is embodied in such a manner that through this electronics, the electrical signals provided by the acoustic transducer are filtered to a bandwidth to be evaluated. Along with that, still other signal processing can be performed, such as, for example, amplification of the respective electrical signal before, or also after, the filtering. Additionally, according to an advantageous further development, an electronics of the vortex flow measuring device is embodied in such a manner that via this electronics, from the electrical signals provided by the acoustic transducer, through a spectral signal processing and/or through a statistical evaluation, a measured variable is determined, which then is evaluated according to predetermined criteria. The electronics can, from values of the (in given cases, filtered) electrical signal registered over time and provided by the acoustic transducer, especially form an RMS value (RMS: Root Mean Square; quadratic average value) and evaluate this as a measured variable. If, for example, N values of the (here filtered) electrical signal $S(t_i)$, which were registered at N different times $t_i$ (i=1–N), are taken into consideration for calculating the RMS-value $\overline{S}$, the RMS-value can then be obtained based on the following Equation (9):

$$\overline{S} = \frac{1}{N}\sqrt{\sum_{i=1}^{i=N} S(t_i)^2} \qquad (9)$$

In an advantageous further development, the electronics of the vortex flow measuring device is embodied in such a manner, that, by means of a transfer factor, which is to be determined via calibration, and via which the kinetic energy of individual particles and/or droplets or the kinetic power of the particle and/or droplet flow is correlated with the measured variable, and by means of the velocity of the particle and/or droplet flow, this electronics determines from the measured variable a number and mass of individual particles and/or droplets, and, respectively, the mass flow of the particle and/or droplet flow. In this way, a quantitative determining of the particle and/or droplet flow of the second medium is possible.

Depending on application, the transfer factor can, according to a first variant, be selected and determined via calibration in such a manner that the measured variable $\overline{M}$, such as, for example, the above mentioned RMS-value $\overline{S}$, is correlated via the transfer factor $C_1$ with the kinetic energy $E_{KIN}$ of an individual impinging particle or droplet. This relationship is shown in the following Equation (10), wherein $m_P$ is the mass of an individual particle or droplet and v is its velocity:

$$E_{KIN} = \frac{1}{2} m_P v^2 = C_1 \overline{M} \qquad (10)$$

As is evident from Equation (7), the mass $m_P$ of an individual particle or droplet can accordingly be determined from the measured variable $\overline{M}$, the transfer factor $C_1$ and the velocity v. The velocity v of the particle, which corresponds to the velocity of the first phase, can be determined in known manner from the vortex frequency by the vortex flow measuring device. This first variant is especially advantageous when the density of the individual particles and/or droplets in the particle and/or droplet flow is low enough that the different impingements of the individual particles on the relevant component of the vortex flow measuring device are separately acoustically detectable. The number of particles and/or droplets can be ascertained by counting the respective impingements.

Depending on application, the transfer factor can also, according to a second variant, be selected and determined via calibration in such a manner that the measured variable $\overline{M}$, like, for example, the above mentioned RMS-value $\overline{S}$, is correlated with the kinetic power $P_{KIN}$ of the particle and/or droplet flow via a transfer factor $C_2$. This relationship is reproduced in the following Equation (11), wherein m/t is the mass flow of the particle and/or droplet flow (wherein only the mass of the particles and/or droplets enters into consideration here, not, however, the mass of the first phase) and v is its velocity:

$$P_{KIN} = \frac{1}{2} \frac{m}{t} v^2 = C_2 \overline{M} \qquad (11)$$

As is evident from Equation (11), the mass flow m/t of the particle and/or droplet flow can accordingly be determined from the measured variable $\overline{M}$, the transfer factor $C_2$ and the velocity v. The velocity v of the particles can, in turn, be determined by the vortex flow measuring device. This second variant is especially advantageous when the density of the individual particles and/or droplets in the particle and/or droplet flow is high enough that the different impingements of the individual particles on the relevant component of the vortex flow measuring device are no longer separately acoustically detectable.

Both in the case of the first, as well as also in the case of the second variant, the transfer factor $C_1$ or $C_2$ can be chosen as a constant, so that the calibration and the desired calculations are simple. Alternatively, the transfer factor $C_1$ or $C_2$ can also be defined as a function of additional variables, such as, for example, temperature, pressure, geometric variables, etc. In this way, other influences can be taken into consideration during the quantitative determining.

The present invention additionally relates to a vortex flow measuring device for detecting wall flow at least of a second flowable phase flowing along a wall of a pipeline—especially for detecting a rivulet—in a first flowable phase flowing in the pipeline—especially in a gas—which has a smaller density than the second flowable phase, wherein the vortex flow measuring device is composed at least of a measuring tube which is insertable into the pipeline, a bluff body and a first vortex sensor. In such case, the bluff body extends in the measuring tube transversely to a flow direction in such a manner, that, for the respective phases on both sides of the bluff body, a flow path is formed in each case, and that on both sides of the bluff body, at least two shedding edges are embodied in such a manner, that, during use, Kármán vortices are shed on these.

The first vortex sensor, as regards its installed position, is arranged downstream from the shedding edges, and includes a sensitive section that responds to occurring pressure fluctuations. The vortex flow measuring device is embodied in such a manner that pressure fluctuations, which are registered during use via the sensitive section, are transduced into an electrical measurement signal. The sensitive section of the first vortex sensor is, in such case, arranged at least partially adjoining the wall of the measuring tube. The electronics of the vortex flow measuring device, through which the electrical measurement signal is processed during use, is embodied in such a manner, that, in the case of registering a measurement signal which contains characteristic features for an interaction of a wall flow of the second phase (flowing along a wall of the measuring tube) with the sensitive section of the first vortex sensor, the existence of a wall flow of the second phase in the measuring tube can be extrapolated. This means that the wall flow of the second phase can be monitored and detected.

The vortex flow measuring device can, in such case, be embodied in such a manner, that, in the case of detection of a wall flow of the second phase, a warning report is output, and especially is presented on a display of the vortex flow measuring device. In the case of the vortex flow measuring device of the invention, the further developments and variants explained above in reference to the method of the invention are possible in corresponding manner. In the case of method steps which require a processing of the measurement signal and/or a calculating or determining of further variables, an electronics of the vortex flow measuring device is embodied in such a manner that the relevant method steps are correspondingly performable via the electronics.

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

Figure 1:
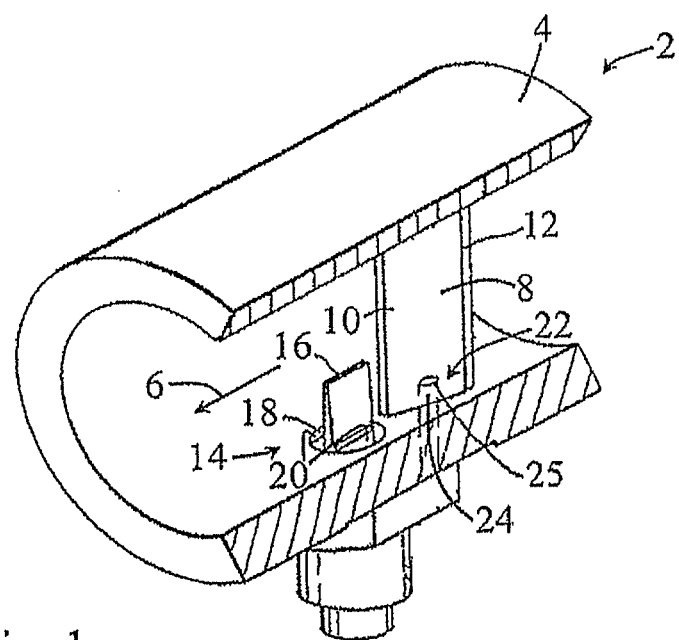
FIG. 1 is a schematic representation of a vortex flow measuring device in a partially sectioned perspective representation according to a first form of embodiment of the invention.

FIG. 1 shows schematically in perspective view a vortex flow measuring device 2 according to a first form of embodiment of the invention. Vortex flow measuring device 2 includes a measuring tube 4, which is shown in FIG. 1 in a partially sectioned representation. During use, measuring tube 4 is inserted into a pipeline (not shown), whose flow of a first phase (here: gas) is to be determined, in such a manner that it is flowed through by the first phase in a flow direction 6.

Vortex flow measuring device 2 includes a bluff body 8, which extends in a diametral direction across the total inner cross section of measuring tube 4. In an inserted position of vortex flow measuring device 2 as illustrated in FIG. 1, measuring tube 4 extends essentially horizontally, while bluff body 8 extends essentially vertically, i.e. parallel to the direction of the force of gravity. Bluff body 8 is, in such case, embodied in such a manner that, on the side (in FIG. 1 hidden) which faces the flow, it has an impingement area, which is flowed against by the respective medium. Adjoining both sides of the impingement area is in each case a lateral surface 10, wherein the two lateral surfaces 10 taper in the flow direction 6, so that bluff body 8 has an essentially Δ-shaped cross section. On both sides of the impingement area, a vortex shedding edge 12 (in FIG. 1, only one of the two shedding edges 12 is visible) is in each case provided, which forms the transition to the two lateral surfaces 10. As is evident from FIG. 1, the respective medium can flow past on both sides of bluff body 8, wherein, as is explained above, vortices are shed alternating in time at the two shedding edges 12. Accordingly, during use, a Kármán vortex street forms in the region behind the two shedding edges 12.

The vortex flow measuring device 2 additionally includes a vortex sensor 14, arranged downstream from bluff body 8. In the present example of an embodiment, vortex sensor 14 includes a paddle 16, which extends into the flow path through a bore 18, whose axis intersects the lowest surface element of measuring tube 4. In such case, paddle 16 is, in a rest position, arranged parallel to bluff body 8 and aligned with the latter. Paddle 16 can swing in a direction perpendicular to flow direction 6, and perpendicular to the direction of extension of paddle 16. Accordingly, during use, due to arising pressure fluctuations, especially due to the formed vortices, paddle 16 swings back and forth. As is explained above, the swinging movements of the paddle are transduced by means of a DSC sensor (not illustrated in greater detail) into an electrically processable, measurement signal (sensor signal). Various types of analysis of the electrical measurement signal obtained in such case, which are performed by an electronics (not shown) of vortex flow measuring device 2, are explained below with reference to the figures beginning with FIG. 3.

Because paddle 16 extends from the bottom through measuring tube 4 into the flow path, paddle 16 forms a sensitive section responding to occurring pressure fluctuations, this sensitive section being arranged partially adjoining the wall of measuring tube 4, and being arranged in a lower half of measuring tube 4. If there is a rivulet (second phase) in the gas, which in the present example of an embodiment forms the first phase, due to the force of gravity, the rivulet gravitates to the lower region of the measuring tube 4, and flows directly adjoining paddle 16. Additionally formed within bore 18, surrounding paddle 16, is a recess 20, in which, in the case of occurrence of a rivulet, a portion of the rivulet collects. Both in the case of the rivulet flowing past paddle 16 as well as also due to the collection of the rivulet inside of recess 20, an interaction of the rivulet with paddle 16 occurs. The measurement signal registered via paddle 16 is influenced due to this interaction. An amplitude fluctuation of the measurement signal is especially increased. Various variants of the analysis of the obtained electrical measurement signal, in order to enable detection of a rivulet, are explained below with reference to the figures beginning with FIG. 3.

FIG. 1 additionally shows via dashed lines an alternative variant of a vortex sensor 22, which is formed within bluff body 8. In the case of this alternative variant, a blind bore 24 for accommodating vortex sensor 22 is provided within bluff body 8 parallel to the direction of extension of bluff body 8. This blind bore 24 includes at least one passageway 25, which produces a fluid connection between the respective medium within the measuring tube 4 and blind bore 24. Accordingly, a vortex sensor 22 arranged within blind bore 24 can register pressure fluctuations which occur in measuring tube 4 downstream from the shedding edges 12 and, which especially are brought about by vortices, and, according to one of the variants explained above, transduce these into an electrical measurement signal. The vortex sensor 22 (not shown in greater detail) can, as explained above, have, for example, a swinging sensor sleeve, whose swinging movements are registered relative to a section decoupled from the pressure fluctuations.

Figure 2:
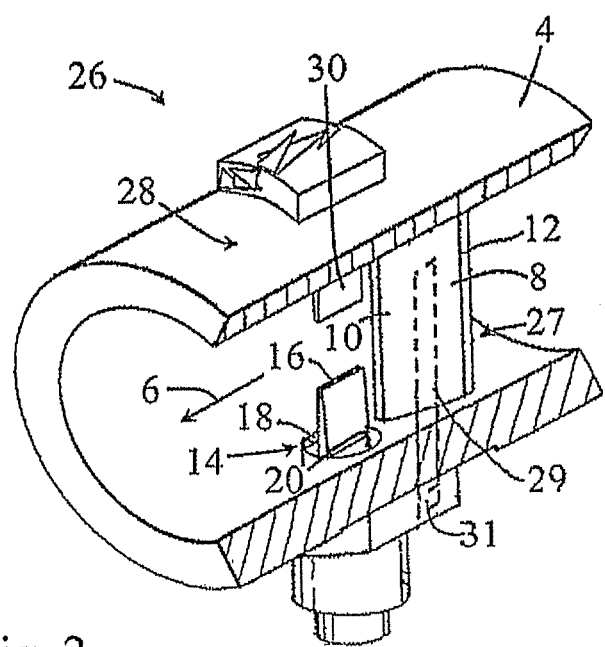
FIG. 2 is a schematic representation of a vortex flow measuring device in a partially sectioned perspective representation according to a second form of embodiment of the present invention.

FIG. 2 shows schematically in perspective view a vortex flow measuring device 26 according to a second form of embodiment of the invention. In the following, primarily the differences with respect to the first form of embodiment explained with reference to FIG. 1 are explored. Equal reference characters are used for equal components.

In contrast to the first form of embodiment, vortex flow measuring device 26 includes a second vortex sensor 28, which is arranged downstream from the bluff body 8. This second vortex sensor 28 in turn includes a paddle 30, which extends into the flow path through a bore (not visible), whose axis intersects the highest surface element of the measuring tube 4. Accordingly, the paddle 30 of the second vortex sensor 28 is arranged lying opposite the paddle 16 of the first vortex sensor 14. In such case, the paddle 30 (of the second vortex sensor 28) is, in a rest position, arranged parallel to the bluff body 8, and aligned with this. The paddle 30 can pivot in a direction perpendicular to the flow direction 6, and perpendicular to the direction of extension of the paddle 30. Accordingly, during use, due to arising pressure fluctuations, especially due to the formed vortex, the paddle 30 is moved back and forth. The swinging movements of the paddle 30 are transduced into an electrical measurement signal in a corresponding manner to that explained above in reference to the first vortex sensor 14. The measurement signal obtained in such case forms a reference signal for a pure flow of the first phase of the flowing medium.

On the basis of this reference signal, the electrical measurement signal of the first vortex sensor 14 (or also variables derived therefrom, such as, for example, a standard deviation or a kurtosis) can be compared in simple manner with the reference signal (or, in given cases, variables derived therefrom, such as, for example, a standard deviation or a kurtosis). For example, there can be defined an upper limit value for a difference of the standard deviation or the kurtosis, as determined which from the measurement signal of the first vortex sensor 14 from the standard deviation or the kurtosis determined from the measurement signal of the second vortex sensor 28, in the case of whose exceeding the existence of a rivulet is deduced. Accordingly, in the case of this second, form of embodiment, a detection of a rivulet, which flows as wall flow along a lower tube section of the measuring tube 4, can be performed in simple manner without a preceding calibrating of the vortex flow measuring device 26. The vortex flow measuring device 26 is, in such case, embodied in such a manner that, in the case of occurrence of a rivulet, it outputs a warning report.

Additionally, the vortex flow measuring device 26 shown in FIG. 2 is embodied in such a manner that a particle and/or droplet flow of the second or a third phase of the flowing medium is also detectable as well as quantitatively determinable via this device. The area of bluff body 8 that faces the flow forms, in such case, an impingement area 27 for incoming particles or droplets. If, in the flowing first phase (here gas), a particle and/or droplet flow (here: a droplet flow of water) occurs, a fraction of the particles and/or droplets then impinges on impingement area 27 of bluff body 8, this fraction corresponding, as a rule, to the ratio of impingement area 27 to the inner cross sectional area of measuring tube 4 (in the case of a particle and/or droplet flow uniformly distributed across the inner cross section). Through such an impingement of particles and/or droplets, acoustic signals are produced. Within bluff body 8, a coupling component 29 is arranged, which in FIG. 2 is presented in a rod-shaped form, and which serves for acoustic coupling between an acoustic transducer 31 and bluff body 8 (especially its impingement area 27). Via this coupling component 29, the acoustic signals produced in the case of impingement of particles and/or droplets on the impingement area 27 are conveyed outwardly to an exterior of the measuring tube 4. Outside of measuring tube 4, on coupling component 29, the acoustic transducer 31—which, in the case of the present form of embodiment, is formed by a piezo element—is placed in such a manner that the acoustic signals are registerable thereby. Via acoustic transducer 31, the acoustic signals are transduced into corresponding electrical signals. The electrical signals provided by acoustic transducer 31 are then forwarded to an evaluating electronics of vortex flow measuring device 2.

The electrical signals which are output by the acoustic transducer 20 are then—as is explained above in the general part of the description—amplified by a correspondingly embodied electronics, and filtered to yield a frequency range to be evaluated. The frequency range to be evaluated is, for example, a range of 100 kHz to 1 MHz. Then, a measured variable to be evaluated—such as, for example, an RMS value—is determined therefrom by the electronics as explained above in the general part of the description. If only a detection of a particle and/or droplet flow is to be performed, the electronics is then, for example, embodied in such a manner that, in the case of an exceeding (or, in given cases, also subceeding/falling beneath) of a predetermined limit value of the measured variable, the presence of a particle and/or droplet flow is deduced. If only a detection is to be performed, then, in given cases, the determining of a measured variable to be evaluated can also be omitted, and a limit value for the signal strength of the electrical signal, for example, can be determined.

If a quantitative evaluation concerning the particle and/or droplet flow is additionally to be performed, beforehand, in the context of a calibration, as explained above in the general part of the description, a transfer factor ($C_1$, or $C_2$) must then be determined, through which the kinetic energy (transfer factor $C_1$) of individual particles and/or droplets, or through which the kinetic power (transfer factor $C_2$) of the particle and/or droplet flow is correlated with the measured variable. In such case, reference is made to Equations (7) and (8), as well as to the associated description in the general part of the description. Via the velocity v of the particle and/or droplet flow, which can be ascertained by the vortex flow measuring device 2 from the vortex frequency, the mass of individual particles and/or droplets, or the mass flow of the particle and/or droplet flow can then be determined (compare Equations (7) and (8)).

Figure 3:
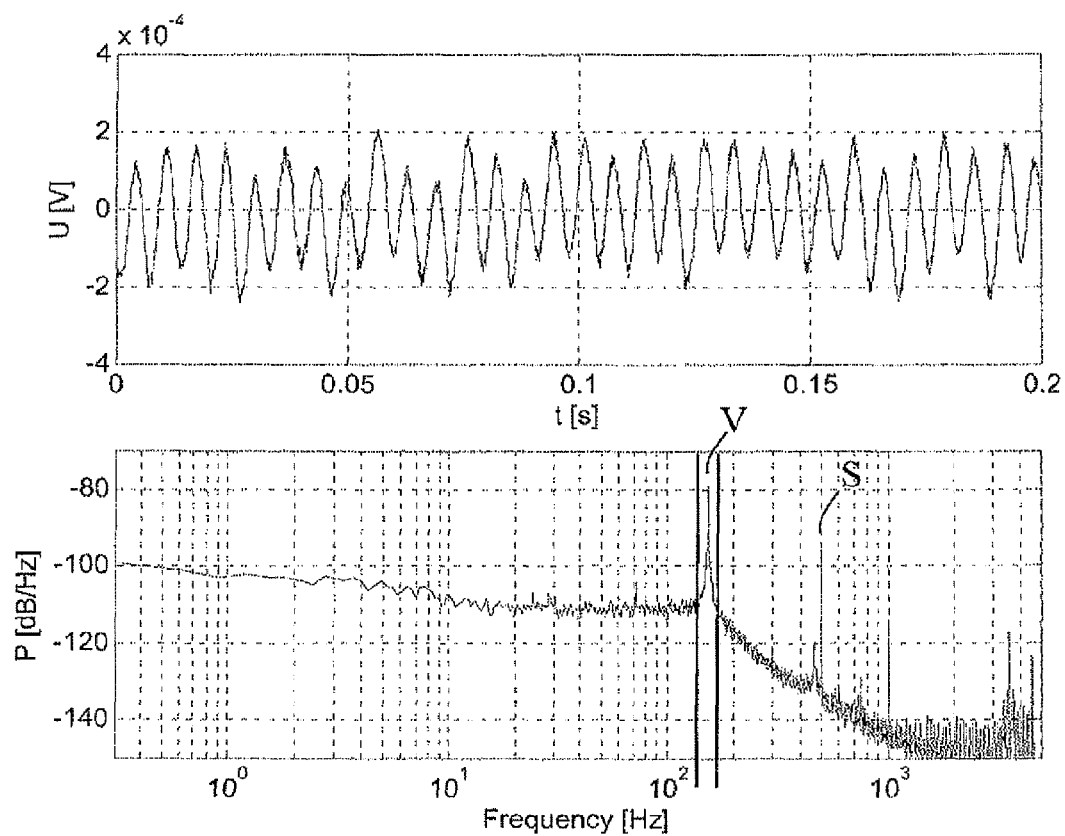
FIG. 3 is a signal as a function of time for a typical measurement signal y(t) (upper figure) and its estimated spectral power density (lower figure)

FIG. 3 shows a typical measurement signal of a pure, single phase flow (here air) with superimposed disturbance fractions due to vibrations. Shown in the lower part of FIG. 3 is the spectral power density of the signal shown for a time segment in the upper part of FIG. 3. FIG. 3 should make clear that, in order to gain relevant information concerning the fraction of the second phase, before an especially statistical evaluation of the measurement signal occurs, it is necessary to select, by means of a narrow band filter, the frequency range V from the measurement signal in a narrow band around the vortex frequency. In this way, it is assured that disturbance signals (e.g. disturbance signal S) do not corruption the monitoring of the second phase, especially when the magnitude of the disturbance fractions is greater than that of the wanted signal, as is the situation in the case of small amounts of flow.

Figure 4:
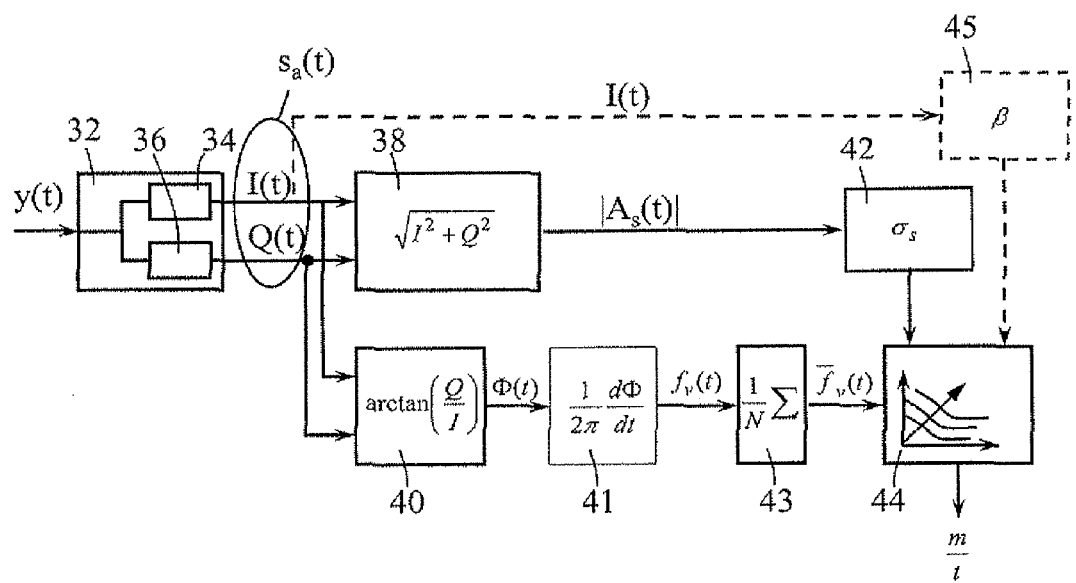
FIG. 4 is a schematic representation for purposes of explanation of a signal processing of the measurement signal for determining mass flow of the second phase, as is explained more precisely herein.

Explained in the following with reference to FIG. 4 is an option for purely digital signal processing of the measurement signal, in order to ascertain therefrom a statistical variable, such as, for instance, the standard deviation of the magnitude of the amplitude and/or the kurtosis of a narrow band filtered, analytical signal $s_a(t)$ of the measurement signal $y(t)$, and in turn to determine therefrom the mass flow of the second phase formed as a rivulet, or wall flow. The registered measurement signal $y(t)$ is first filtered in a filter stage 32 to a bandwidth of less than 50% of the vortex frequency, with the vortex frequency as the center frequency. The filter stage 32 includes therefor two filters 34 and 36 connected in parallel. In the case of a first filter 34 of the two filters, the filter coefficients are selected in such a manner that the filtered measurement signal $I(t)$ is output with as close to no phase shift as possible. This first filter 34 is referred to in the following as an in-phase filter 34. In the case of the second filter 36, the filter coefficients are selected in such a manner that the filtered measurement signal $Q(t)$ has a phase shift of +90° compared to the filtered measurement signal I(t) of the in-phase filter 34. The second filter 36 is referred to in the following as the quadrature filter 36. If, for example, the measurement signal is described in a simplified manner (without taking into consideration the additional frequencies) as $U(t)*\sin(\omega_v t)$, wherein $\omega_v$ is the vortex frequency, the signal which is delivered by in-phase filter 34 is then $I(t)=U(t)*\sin(\omega_v t)$, while the signal which is delivered by quadrature filter 36 is $Q(t)=U(t)*\cos(\omega_v t)$. In order to assure that the two signals I(t) and Q(t) belonging together are output at the same time by the two filters 34 and 36, the two filters 34 and 36 have the same group travel time.

Then, by means of a CORDIC algorithm, an amplitude magnitude $A_s(t)$ (see box 38) of the analytical signal and the phase $\Phi(t)$ of the analytical signal (see box 40) are ascertained from the output signals I(t) and Q(t). The amplitude magnitude $A_s(t)$ is especially yielded from the two output signals I(t) and Q(t) based on Equation (3). The phase $\Phi(t)$ of the analytical signal is yielded on the basis of Equation (4). By differentiating phase $\Phi(t)$ with respect to time, the instantaneous vortex frequency $f_V(t)$ can additionally be obtained (see box 41). In order to obtain an average vortex frequency $\bar{f}_v$ of the flow, the instantaneous vortex frequency is correspondingly averaged over N values (compare box 43).

In the case of a digital implementation, the amplitude magnitudes $A_s(t_i)$ determined at different times $t_i$ in the manner explained above can be stored, for example, in a buffer or ring memory. In such case, the measurement signal y(t) is, in each case filtered and analyzed, as much as possible, at equal time intervals, and the amplitude magnitude $A_s(t)$ is ascertained therefrom. The time intervals are, in such case, suitably selected as a function of the vortex frequency. N (for example, 100) consecutive values $A_s(ti)$ of the amplitude magnitude, which were ascertained in temporal sequence, are then read out from the buffer memory, and the standard deviation (compare Equation (3)) is calculated therefrom (see box 42). Then, based on a correlation, in which a standard deviation of the magnitude amplitude, a vortex frequency and a mass flow of a rivulet of the second phase are placed in relationship relative to one another, a mass flow m/t of the rivulet is ascertained (see box 44). The correlation is, in such case, stored as a fitted function in the vortex flow measuring device. The determining of such a fitted function, or correlation, can, in such case, occur experimentally with different known mass flows of the second phase in the form of a rivulet, and with different flow velocities of the first phase of a flowing medium.

Instead of the standard deviation of the magnitude of the amplitude of the filtered analytical signal, the kurtosis of $I(t)=Re(s_a(t))$, the real part of the filtered signal $s_a(t)$, can alternatively also be taken into consideration for monitoring/calibrating. This is indicated in FIG. 4 in dashed form as a variant that includes box 45.

In the following, a variant for determining a fitted function, or correlation, by which a kurtosis of the measurement signal, a vortex frequency and a mass flow of a rivulet of the second phase of a flowing medium are placed in relationship relative to one another is explained with reference to FIGS. 5 to 8. In such case, the first phase of the medium is formed by air and the second phase by water, wherein the water flows along the wall of the measuring tube as a wall flow (or wall film flow), i.e. as a rivulet. A correlation, such as is applied in the case of the signal processing illustrated in FIG. 4, and via which a standard deviation of the magnitude of the amplitude of the filtered analytical signal, a vortex frequency and a mass flow of a rivulet of the second phase of a flowing medium are placed in relationship relative to one another, can, in such case, be determined in corresponding manner.

Figure 5:
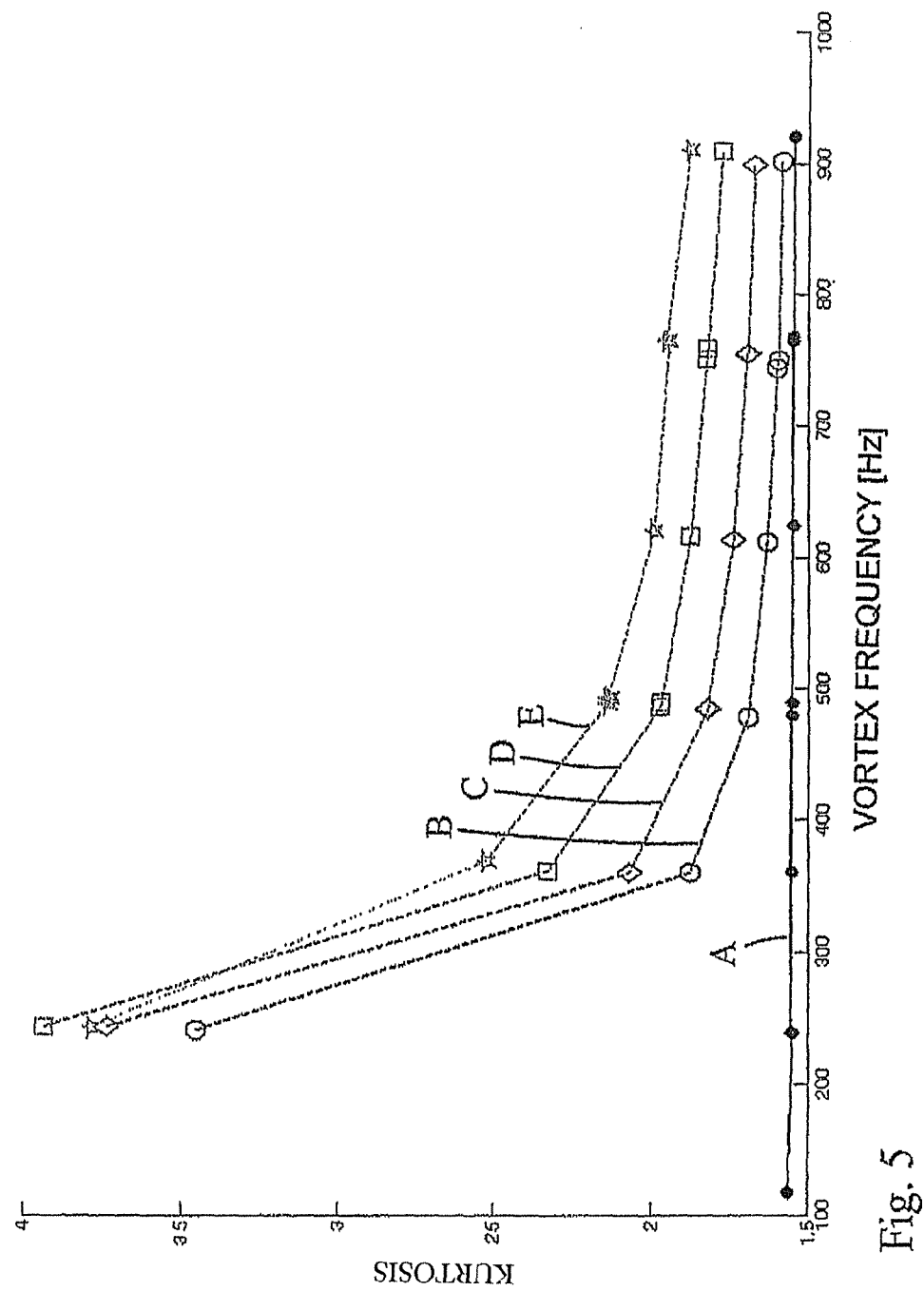
FIG. 5 is a graphical representation of kurtosis of a filtered measurement signal sa(t) versus vortex frequency for different mass flows of water (second phase) and for different flow velocities of air (first phase) in the case of two-phase flow of water and air.

FIG. 5 shows graphically kurtosis of the filtered measurement signal $Re(s_a(t))$ versus vortex frequency. In such case, the different measurement curves correspond to different mass flows of the rivulet. In particular, in the case of curve A, a pure air flow was present, in the case of curve B, a mass flow of water of 10 kg/h (kilogram per hour) was present, in the case of curve C a mass flow of water of 20 kg/h was present, in the case of curve D, a mass flow of water of 30 kg/h was present and in the case of curve E, a mass flow of water of 40 kg/h. This lettered marking for the different mass flows of water is maintained consistently throughout FIGS. 5 to 9. The different measurement points of the curves were in each case obtained by setting different flow velocities of air (first phase) while keeping mass flow of water constant. The kurtosis can, in such case, be obtained from the measurement signal (as filtered earlier to a narrow band around the particular vortex frequency) using Equations (6) through (8).

As is evident from FIG. 5, at constant vortex frequency, kurtosis increases with increasing mass flow of water. Additionally evident from FIG. 5 is that, in the present example of an embodiment, in a range of low flow velocities of air, in the case of vortex frequencies clearly under 350 Hz, this behavior only still applies in a limited manner. Accordingly, the referencing of the kurtosis of the measurement signal for determining the mass flow of the rivulet flow of water (generally of the second medium) is suitable only in the case of flow velocities of the first phase which lie above a limit flow velocity in each case to be determined. This limit flow velocity depends on the particular vortex flow measuring device, especially on the diameter of the measuring tube, as well as on the properties of the first and second phases.

First, for a pure air flow, the particular vortex frequency versus air volume flow is approximated with a linear function for different flow velocities of the air. The slope of the linear function corresponds, in such case, to the calibration factor, which generally must be determined for vortex flow measuring devices, especially for the flow measurement of single phase fluids. This step is not graphically presented in the Figs.

Figure 6:
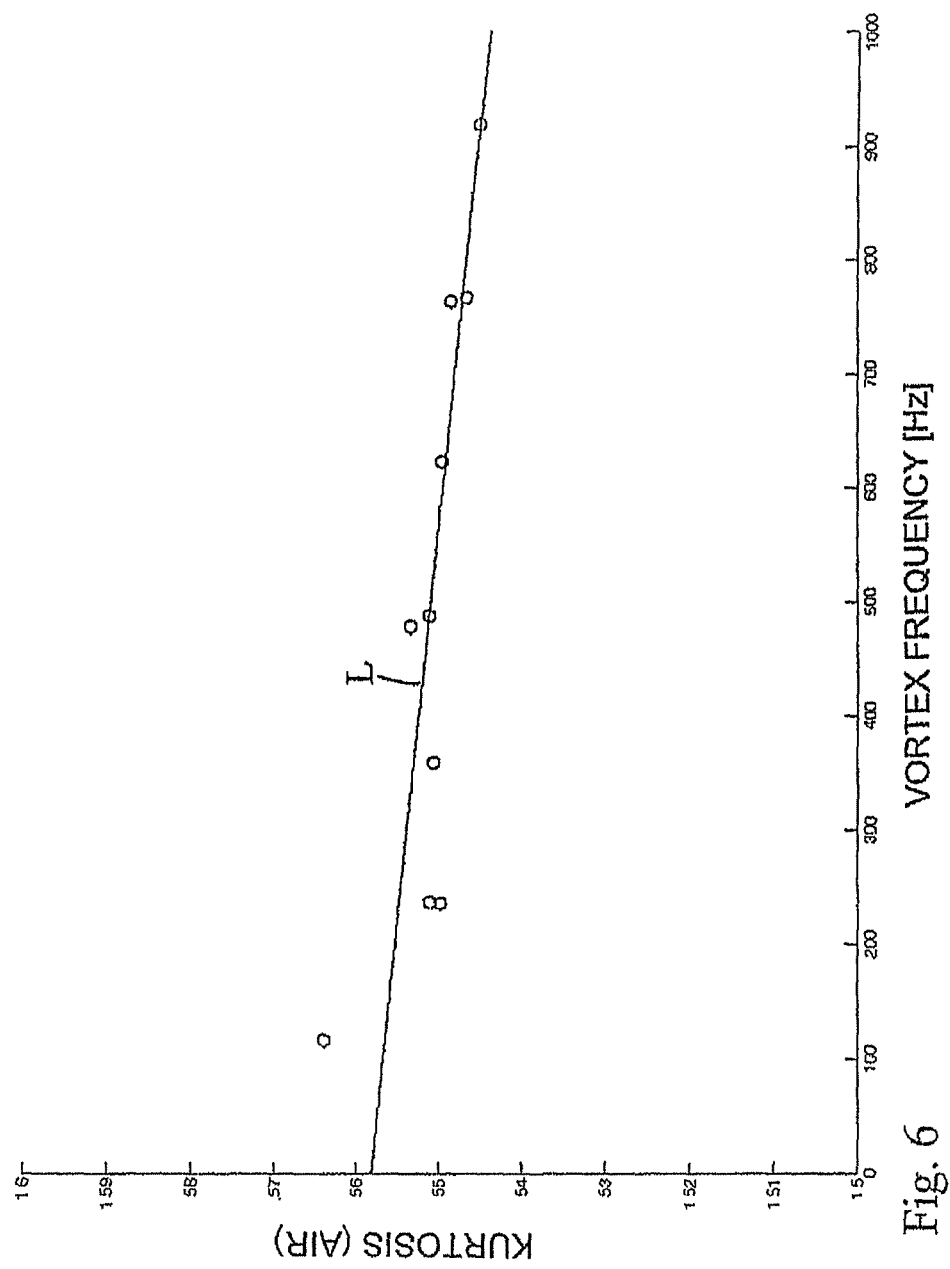
FIG. 6 is a graphical representation of kurtosis of a filtered measurement signal sa(t) versus vortex frequency for different flow velocities of pure (dry) air (first phase), for determining a linear calibration function.

In a next step, in the case of a pure air flow, the kurtosis for different flow velocities of air (first phase) is ascertained, and the curve is, in turn, approximated via a linear calibration function. This is graphically presented in FIG. 6, in which, for different flow velocities of air, the values of the kurtosis are in each case plotted versus vortex frequency. In FIG. 6, the individual measurement points are presented in each case as circles, while the linear calibration function L is drawn as a solid line. The linear calibration function L obtained in this step is taken into consideration as a reference as regards values of the kurtosis ascertained in the case of the occurrence of a water rivulet.

Figure 7:
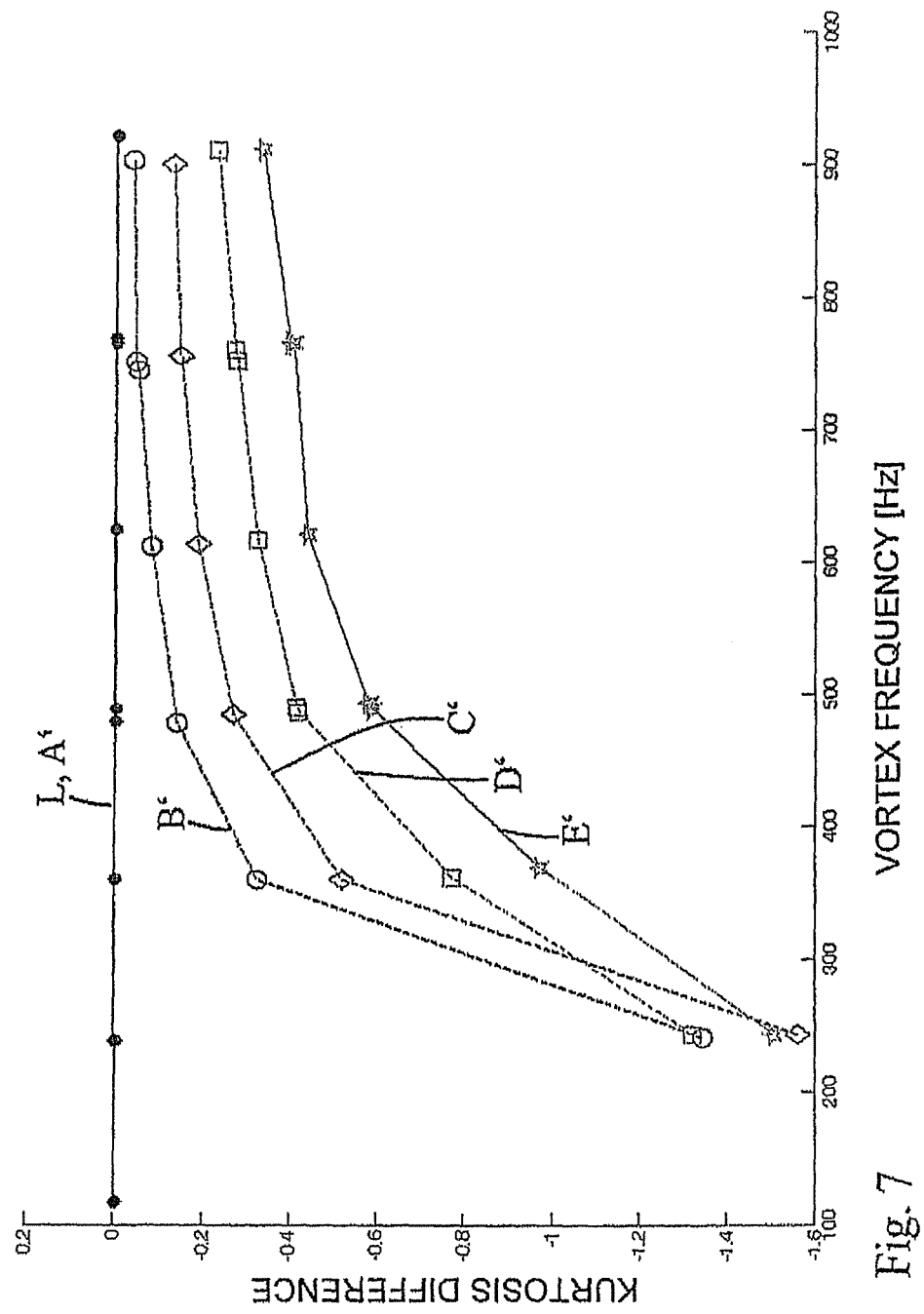
FIG. 7 is a graphical representation of the difference between kurtosis values of the calibration function and kurtosis values of the respective filtered measurement signal versus the vortex frequency for different mass flows of water (second phase) and for different flow velocities of air (first phase) in the case of two-phase flow of water and air.
Figure 8:
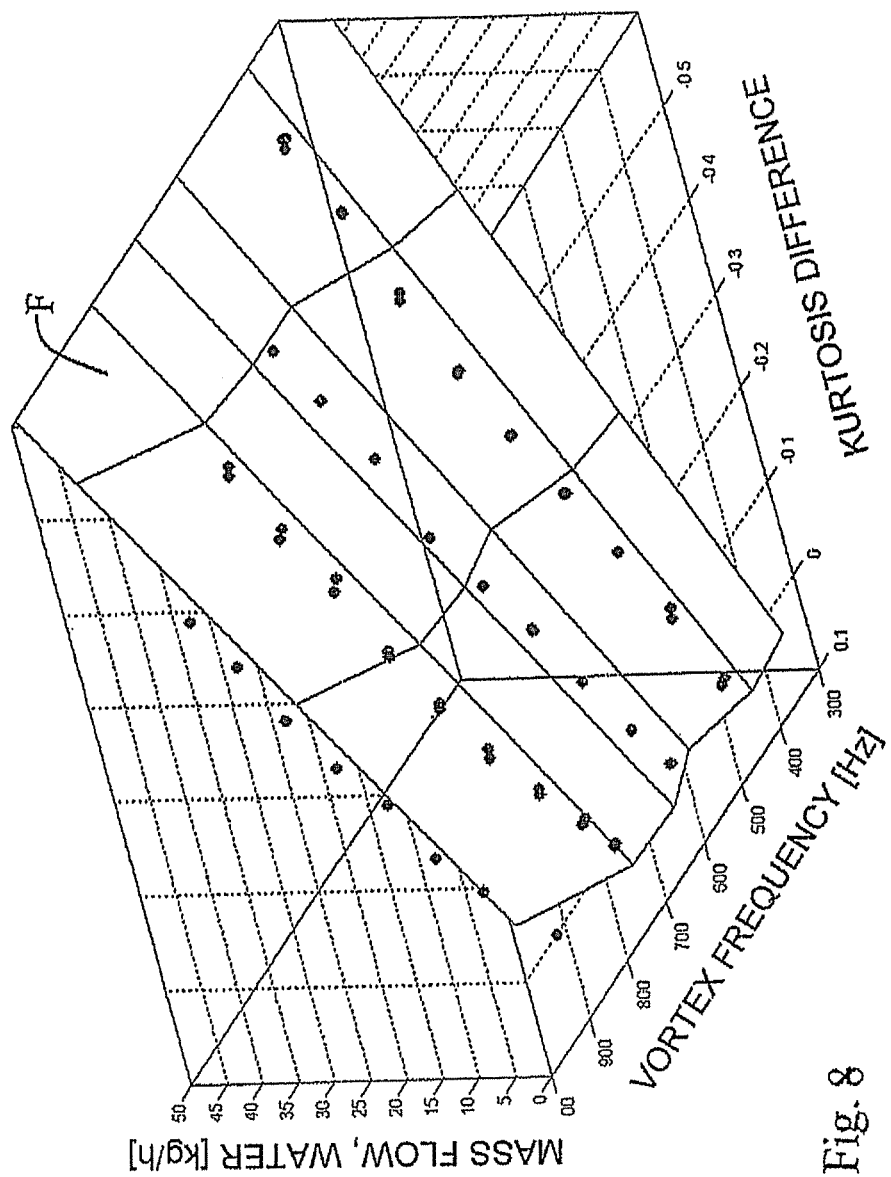
FIG. 8 is a three-dimensional graphical representation, in which, for different mass flows of water (second phase) and for different flow velocities of air (first phase), the mass flows of water, the vortex frequency determined from the filtered measurement signal and the difference of the kurtosis values determined from the filtered measurement signal are correlated with one another.

In a next step, difference of the graphs A-E of the kurtosis versus vortex frequency, as presented in FIG. 5, is formed relative to the linear calibration function L (compare FIG. 6). The resulting graphs A'-E' obtained in such case, in the case of which the difference of the kurtosis versus vortex frequency is plotted, are shown in FIG. 7.

Finally, in a last step, for the different performed measurements, the difference in the kurtosis, the vortex frequency and the (in each case known) mass flow of water (which flows as a rivulet) are placed in relationship relative to one another. The measurement points drawn in three dimensional space are additionally approximated by a surface F, which forms the fitted function, or correlation. This is graphically presented in FIG. 8. In such case, in FIG. 8, the individual measurement points, in each case, are drawn as black points in the three dimensional space defined by kurtosis difference, vortex frequency and mass flow of water (which flows as a rivulet). The surface F is likewise drawn in FIG. 8.

In the use of the vortex flow measuring device, a flow velocity and/or a volume flow rate of the air (first medium) can be ascertained from the vortex frequency determined by the vortex flow measuring device from the measurement signal, and from the earlier ascertained calibration factor. Additionally, by determining the kurtosis of the measurement signal, the difference of said kurtosis can be calculated relative to the linear calibration function L. Via the surface F, which, for example, is stored in the vortex flow measuring device as a reference number, using the obtained vortex frequency and the obtained kurtosis difference, the mass flow of water (second phase), which flows as a rivulet, can be ascertained. Additionally, in given cases, a correction of the volume flow of air (first phase) can be performed. For this, from the ascertained mass flow of the water, the lessening of the cross sectional area for the flowing air caused thereby is, for example, estimated. On the basis of this variable, the volume flow rate of the air (first phase) determined from the vortex frequency can then be determined.

Should the vortex flow measuring device be applied exclusively for detection of a rivulet (generally of a second phase), all of the steps explained above for determining the correlation or fitted function need not be performed. Rather, it is sufficient, for example, when only the linear calibration function L, as presented in FIG. 6, is ascertained, and then, during use of the vortex flow measuring device, the difference in the kurtosis, as is presented in FIG. 7, is in each case ascertained. Additionally, a limit value for the kurtosis difference can be defined, in the case of whose exceeding a rivulet (generally a wall flow of a second phase) is detected. The limit value can, in such case, also be defined as a function of the respective vortex frequency.

Figure 9:
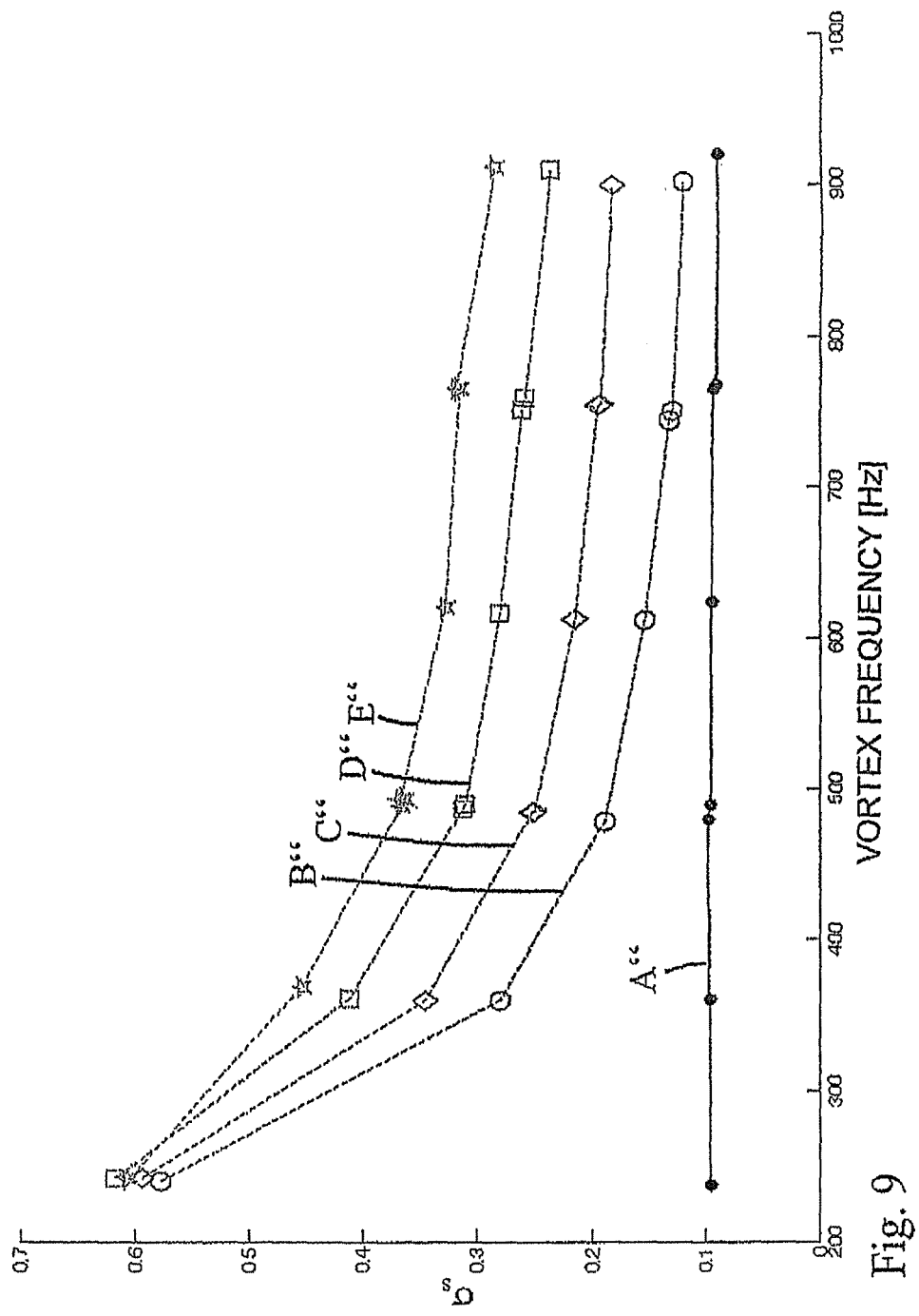
FIG. 9 is a graphical representation of the standard deviation of the magnitude of the amplitude of an analytical filtered measurement signal of the registered measurement signal versus vortex frequency for different mass flows of water (second phase) and for different flow velocities of air (first phase).

FIG. 9 graphically presents, in each case, the standard deviation $\sigma_s$ of the magnitude of the amplitude of the filtered analytical signal of the registered measurement signal versus vortex frequency. In such case, the different measurement curves A"-E" in each case correspond to different mass flows of the water rivulet in air, as is given above in the letter notation. The different measurement points of a curve were in each case obtained by setting different flow velocities of air (first phase) while keeping mass flow of water constant. The standard deviation $\sigma_s$ can be obtained, in such case, from the measurement signal in the manner explained with reference to FIG. 4.

As is evident from FIG. 5, standard deviation increases at constant vortex frequency with increasing mass flow of water. Additionally, evident from FIG. 5 is that, at low flow velocities of air—i.e., in the present example of an embodiment, at vortex frequencies clearly under 350 Hz—this behavior only applies to a limited degree. Accordingly, use of the standard deviation for determining mass flow of water (generally, the second phase) is only suitable in the case of flow velocities for the first phase of a flowing medium lying above a limit flow velocity to be determined for each given case. This limit flow velocity depends, again, on the particular vortex flow measuring device—especially on the diameter of the measuring tube—as well as on the properties of the first and second phases of the medium.

As is evident from FIG. 9, standard deviation can be taken into consideration for determining a correlation or a fitted function in a corresponding manner to that explained above with reference to FIGS. 5 to 7.

@The present invention is not limited to the examples of embodiments explained with reference to the figures. Especially, alternative statistical evaluation options can be applied, in order to determine the fluctuation versus time of the magnitude of the amplitude of the filtered analytical signal of the measurement signal. Additionally, for ascertaining the standard deviation of the magnitude of the amplitude of the analytical signal of the registered measurement signal, it is not absolutely required that the respective complex part Q(t) be supplemented as was explained above (for example, by applying the Hilbert-transformation or through use of a quadrature filter). For example, the amplitude magnitude can be determined at the times at which the particular filtered (especially to a frequency range around the vortex frequency) measurement signal passes through a maximum or a minimum. This determining can, for example, occur by means of a peak detector. Additionally, the amplitude magnitude can also be determined via rectification of the measurement signal with a low-pass filter. The vortex frequency can additionally be determined via a zero passing counter, which, in each case, registers zero passings of the filtered measurement signal. Along with these, still other methods familiar to those skilled in the art exist for determining amplitude as well as vortex frequency from the measurement signal.

The invention claimed is:

1. A method for monitoring and/or measuring a two-phase medium flowing in a pipeline and including a first phase, with a first density and a second phase, with a second density different from the first density, said method comprising:
   using a bluff body protruding into the flowing medium for producing Kármán vortices in the flowing medium at least near a vortex sensor placed downstream the bluff body, said vortices being shed by the bluff body with a vortex shedding frequency dependent on an instantaneous flow velocity of the flowing medium;
   permitting at least a portion of the second phase of the flowing medium to flow along a wall near the vortex sensor;
   using said vortex sensor registering periodic pressure fluctuations caused by the Kármán vortices in the flowing medium and for producing a sensor signal corresponding to the pressure fluctuations;
   selecting from the sensor signal a wanted signal component, signal component exhibiting a frequency band containing the vortex shedding frequency; and
   using the wanted signal component selected from the sensor signal for detecting the presence of the second phase of the flowing medium.

2. The method as claimed in claim 1, wherein:
   said using the wanted signal component selected from the sensor signal for detecting the presence of the second phase of the flowing medium includes determining a kurtosis of the wanted signal component.

3. The method as claimed in claim 1, wherein:
   the vortex sensor includes a sensitive section formed by a swinging section, which, via occurring pressure fluctuations, is displaceable with a swinging movement, and swinging movements of the swinging section are transduced to the sensor signal for registering said periodic pressure fluctuations caused by the Karman vortices in the flowing medium.

4. The method as claimed in claim 1, further comprising:
   detecting a distributed particle and/or droplet flow of at least a second or at least a third phase of a medium, including:
   using an acoustic transducer, which is integrally formed in the bluff body for registering acoustic signals produced by impingement of particles and/or droplets of the second or third phase on the bluff body; and using the acoustic transducer for transducing the acoustic signals registered via the acoustic transducer into electrical signals.

5. The method as claimed in claim 4, wherein:
the bluff body has an impingement area directed essentially perpendicular to the flow direction and facing the flow.

6. The method as claimed in claim 1, further comprising detecting a distributed particle and/or droplet flow of at least a second or at least a third phase of a medium, including:
using an acoustic transducer acoustically coupled to the bluff body for registering acoustic signals produced by impingement of particles and/or droplets of the second or third phase on the bluff body; and
using the acoustic transducer for transducing the acoustic signals registered via the acoustic transducer into electrical signals.

7. A method for monitoring and/or measuring a two-phase medium flowing in a pipeline, said medium including a first phase with a first density and a second phase with a second density different from the first density, said method comprising:
using a bluff body protruding into the flowing medium for producing Karman vortices in the flowing medium at least near a first vortex sensor placed downstream the bluff body, said vortices being shed by the bluff body with a vortex shedding frequency dependent on an instantaneous flow velocity of the flowing medium;
permitting at least a portion of the second phase of the flowing medium to flow along a wall near first vortex sensor;
using said first vortex sensor for registering periodic pressure fluctuations caused by the Karman vortices in the flowing medium and for producing a sensor signal corresponding to the pressure fluctuations;
selecting from the sensor signal a wanted signal component, signal component exhibiting a frequency band containing the vortex shedding frequency;
using a second vortex sensor, which includes a sensitive section responding to pressure fluctuations and which is arranged downstream from the shedding edges of the bluff body in an upper half of a horizontally arranged or inclined measuring tube, for registering pressure fluctuations; and for transducing pressure fluctuations registered via the sensitive section of the second vortex sensor into an electrical measurement signal;
and using the wanted signal component selected from the sensor signal and said electrical measurement signal for detecting the presence of the second phase of the flowing medium wherein:
said electrical measurement signal is used as a reference signal for a pure flow of the first phase of a flowing medium.

8. The method as claimed in claim 7, wherein:
the first vortex sensor includes a swinging paddle, which extends into the flow path through an opening formed downstream from the bluff body in a lower section of the measuring tube; and
formed around the paddle is a recess for accommodating a second phase of a flowing medium which flows past as a wall flow.

9. A vortex flow measuring device for monitoring and/or measuring a two-phase medium flowing in a pipeline, and including a first phase with a first density and a second phase with a second density different from the first density, said measuring device comprising:
a measuring tube;
electronics;
a bluff body protruding into the flowing medium; and
a vortex sensor placed downstream from or within said bluff body,
wherein:
said bluff body extends into said measuring tube transversely to a flow direction in such a manner that, for the particular medium, flow paths are formed on both sides of the bluff body, and that on both sides of said bluff body, at least two shedding edges are embodied in such a manner that, during use, Kármán vortices are shed on said two shedding edges;
said vortex sensor, with respect to an installed position, is arranged downstream from said shedding edges and includes a sensitive section responding to pressure fluctuations and the vortex sensor is embodied in such a manner that pressure fluctuations which are registered during use via said sensitive section, are transduced into an electrical measurement signal;
said sensitive section of said first vortex sensor is arranged at least partially adjoining a wall of said measuring tube; and
said electronics, via which the electrical measurement signal during use is processed, is embodied in such a manner that, in the case of registering a measurement signal which contains characteristic features for an interaction of a wall flow of the second phase of the two-phase medium flowing along a wall of said measuring tube with the sensitive section of said first vortex sensor, the existence of a wall flow of the second phase of the two-phase medium in said measuring tube is deduced.

* * * * *